(12) United States Patent
Kataoka

(10) Patent No.: US 11,277,171 B2
(45) Date of Patent: Mar. 15, 2022

(54) NONCONTACT COMMUNICATION MEDIUM, MAGNETIC TAPE CARTRIDGE, OPERATION METHOD OF NONCONTACT COMMUNICATION MEDIUM, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/165,970

(22) Filed: Feb. 3, 2021

(65) Prior Publication Data

US 2021/0242905 A1    Aug. 5, 2021

(30) Foreign Application Priority Data

Feb. 4, 2020   (JP)   ............... JP2020-017417

(51) Int. Cl.
*H04B 5/00* (2006.01)
*H02J 50/10* (2016.01)
*H02J 50/80* (2016.01)
*H02J 50/00* (2016.01)

(52) U.S. Cl.
CPC .......... *H04B 5/0031* (2013.01); *H02J 50/005* (2020.01); *H02J 50/10* (2016.02); *H02J 50/80* (2016.02); *H04B 5/0037* (2013.01); *H04B 5/0081* (2013.01)

(58) Field of Classification Search
CPC .. H04B 5/0031; H04B 5/0081; H04B 5/0037; H02J 50/10; H02J 50/80; H02J 50/005
USPC ........................................................ 455/41.1
See application file for complete search history.

(56) References Cited

U.S. PATENT DOCUMENTS

| 7,093,765 | B2* | 8/2006 | Baldischweiler .. G06K 19/0712 235/492 |
| 2021/0012174 | A1* | 1/2021 | Ono ........................ H02J 50/12 |

FOREIGN PATENT DOCUMENTS

| JP | 2002-352554 A | 12/2002 |
| JP | 2003-526852 A | 9/2003 |
| JP | 2006-134150 A | 5/2006 |
| WO | 2019/176325 A1 | 9/2019 |
| WO | 2019/198438 A1 | 10/2019 |

(Continued)

OTHER PUBLICATIONS

Office Action issued by the JPO in corresponding Japanese Application No. 2020-017417, dated Aug. 11, 2020.

(Continued)

*Primary Examiner* — Eugene Yun
(74) *Attorney, Agent, or Firm* — Solaris Intellectual Property Group, PLLC

(57) ABSTRACT

A noncontact communication medium includes a power generator that has a coil and generates power with application of an external magnetic field from an outside to the coil, a clock signal generator that generates a clock signal using the power, a processor that operates using the power and executes processing on a command included in the external magnetic field. The clock signal generator makes a frequency of the clock signal lower as intensity of the external magnetic field is smaller, in a period except for a processing period in which the processor executes the processing.

6 Claims, 24 Drawing Sheets

(56) References Cited

FOREIGN PATENT DOCUMENTS

WO 2019/198527 A1 10/2019

OTHER PUBLICATIONS

Office Action issued by the JPO in corresponding Japanese Application No. 2020-017417, dated Oct. 27, 2020.
"Explanation of Circumstances Concerning Accelerated Examination", filed in the JPO on Jul. 10, 2020, in corresponding Japanese Application No. 2020-017417.

* cited by examiner

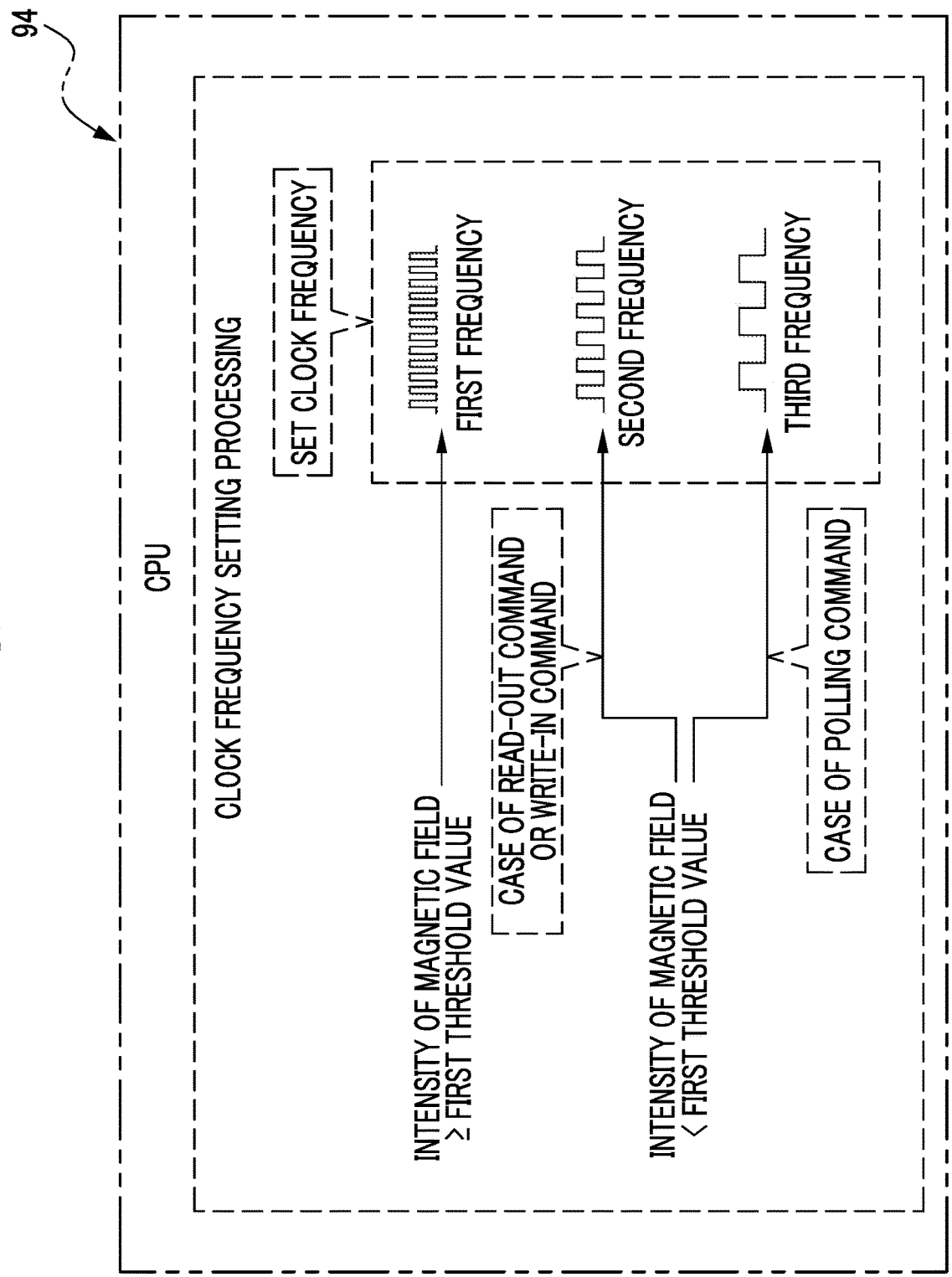

NONCONTACT COMMUNICATION MEDIUM, MAGNETIC TAPE CARTRIDGE, OPERATION METHOD OF NONCONTACT COMMUNICATION MEDIUM, AND PROGRAM

CROSS-REFERENCE TO RELATED APPLICATIONS

This application claims priority under 35 USC 119 from Japanese Patent Application No. 2020-017417 filed on Feb. 4, 2020, the disclosure of which is incorporated by reference herein.

BACKGROUND

1. Technical Field

A technique of the present disclosure relates to a noncontact communication medium, a magnetic tape cartridge, an operation method of a noncontact communication medium, and a program.

2. Related Art

WO2019/198438A discloses a noncontact communication medium comprising a memory unit, a power generation unit, a power monitoring unit, and a capacitance controller. In the noncontact communication medium described in WO2019/198438A, the memory unit stores predetermined management information. The power generation unit has a resonance circuit having an antenna coil and a resonance capacitance unit with a variable capacitance value, and a rectification circuit that rectifies a resonance output of the resonance circuit, and generates power to be supplied to the memory unit. The power monitoring unit has a current adjustment element that is connected in parallel to the rectification circuit with respect to the resonance circuit and has a variable resistance value, a reference voltage generation source that generates a reference voltage, and an operational amplifier that performs control such that the current adjustment element adjusts an output voltage of the rectification circuit to be equal to the reference voltage. The capacitance controller is configured to control the resonance capacitance unit based on an output of the operational amplifier.

WO2019/198527A discloses a noncontact communication medium for a recording medium cartridge. The noncontact communication medium comprises a circuit component, a support substrate, and an antenna coil. In the noncontact communication medium described in WO2019/198527A, the circuit component incorporates a memory unit configured to store management information relating to a recording medium cartridge. The support substrate supports the circuit component. The antenna coil has a coil unit that is electrically connected to the circuit component and is formed on the support substrate, and an inductance value of the coil unit is equal to or greater than 0.3 µH and equal to or less than 2.0 µH.

WO2019/176325A discloses a noncontact communication medium comprising a voltage generation unit, a memory unit, a clock signal generation unit, and a controller. In the noncontact communication medium described in WO2019/176325A, the voltage generation unit has an antenna coil for transmission and reception and receives a signal magnetic field from external equipment to generate power. The memory unit stores one or more circuit parameters set in the voltage generation unit and predetermined management information. The clock signal generation unit is configured to selectively generate clock signals of two or more different frequencies. The controller is configured to select the frequency of the clock signal supplied from the clock signal generation unit to the memory unit.

SUMMARY

An embodiment according to the technique of the present disclosure provides a noncontact communication medium, a magnetic tape cartridge, an operation method of a noncontact communication medium, and a program capable of realizing both stabilization of an operation and reduction in power consumption of the noncontact communication medium.

A first aspect according to the technique of the present disclosure is a noncontact communication medium comprising a power generator that has a coil and generates power with application of an external magnetic field from an outside to the coil, a clock signal generator that generates a clock signal using the power, and a processor that operates using the power and executes processing on a command included in the external magnetic field, in which the clock signal generator makes a frequency of the clock signal lower as intensity of the external magnetic field is smaller, in a period except for a processing period in which the processor executes the processing.

A second aspect according to the technique of the present disclosure is the noncontact communication medium according to the first aspect further comprising a first memory that stores information, in which the command is a polling command, a read-out command, or a write-in command, the processor is configured to execute polling processing according to the polling command, execute read-out processing relating to the information on the first memory according to the read-out command, and execute write-in processing relating to the information on the first memory according to the write-in command, and the clock signal generator makes the frequency lower as the intensity of the external magnetic field is smaller in at least one of a period between the polling processing and the read-out processing, a period between the polling processing and the write-in processing, or a period between the read-out processing and the write-in processing.

A third aspect according to the technique of the present disclosure is the noncontact communication medium according to the first aspect, in which the clock signal generator changes the frequency according to a kind of the command.

A fourth aspect according to the technique of the present disclosure is the noncontact communication medium according to any one of the second aspect to the fourth aspect, in which the coil transmits a processing result of the processing executed by the processor through the external magnetic field.

A fifth aspect according to the technique of the present disclosure is a magnetic tape cartridge comprising the noncontact communication medium according to the first aspect, and a magnetic tape, in which the noncontact communication medium has a second memory, and the second memory stores information relating to the magnetic tape.

A sixth aspect according to the technique of the present disclosure is an operation method of a noncontact communication medium including a power generator that has a coil and generates power with application of an external magnetic field from an outside to the coil, a clock signal generator that generates a clock signal using the power, and a processor that operates using the power and executes processing on a command included in the external magnetic field. The operation method comprises making a frequency of the clock signal lower as intensity of the external magnetic field is smaller, in a period except for a processing period in which the processor executes the processing.

A seventh aspect according to the technique of the present disclosure is a program that causes a computer, which is applied to a noncontact communication medium comprising a power generator that has a coil and generates power with application of an external magnetic field from an outside to the coil, a clock signal generator that generates a clock signal using the power, and a processor that operates using the power and executes processing on a command included in the external magnetic field, to execute processing comprising making a frequency of the clock signal lower as intensity of the external magnetic field is smaller, in a period except for a processing period in which the processor executes the processing.

BRIEF DESCRIPTION OF THE DRAWINGS

Exemplary embodiments of the present invention will be described in detail based on the following figures, wherein:

FIG. 14 is a block diagram showing a second modification example of the clock frequency setting processing according to the embodiment;

DETAILED DESCRIPTION

Figure 1:
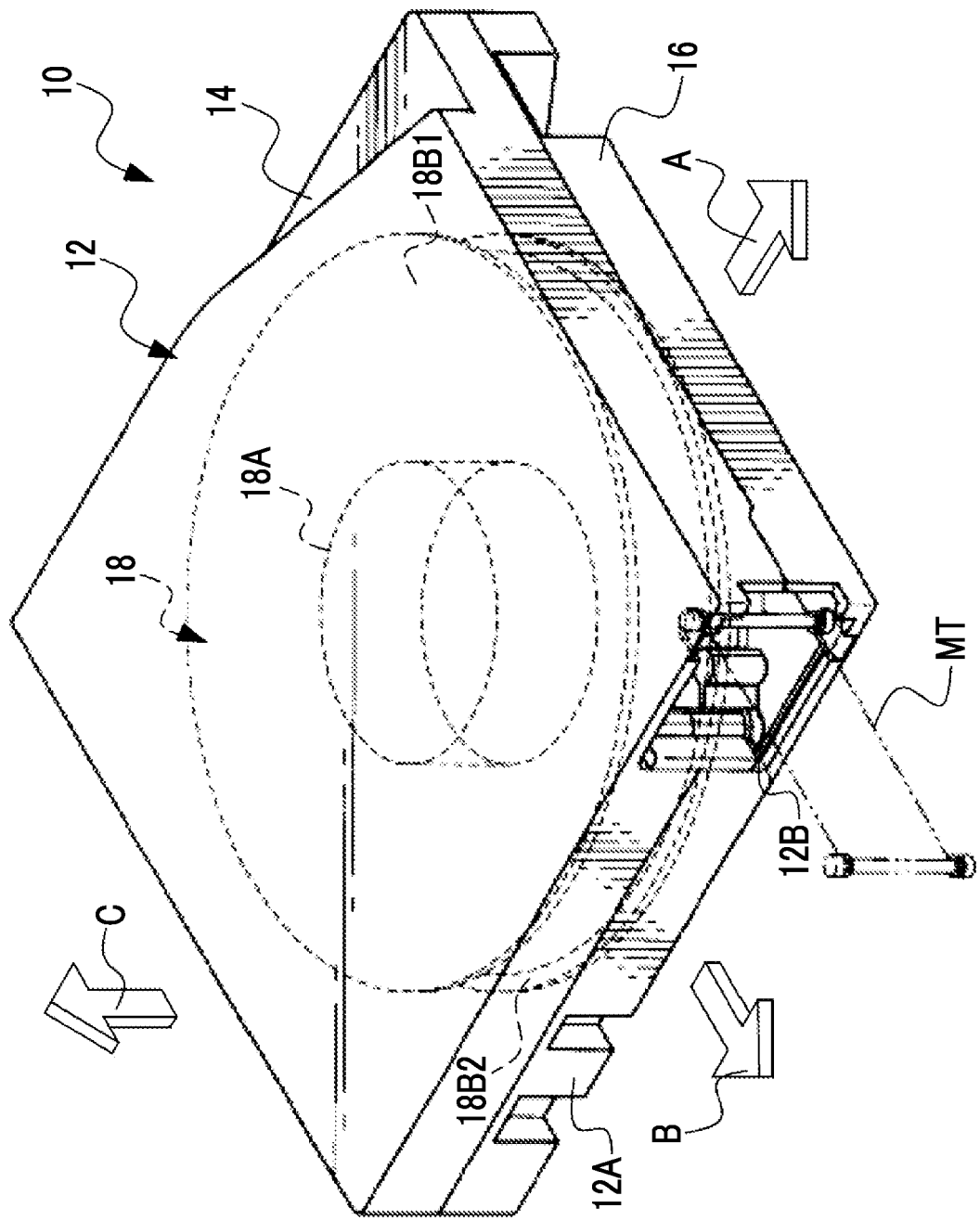
FIG. 1 is a schematic perspective view showing an example of the appearance of a magnetic tape cartridge according to an embodiment.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

In the following description, LTO will be described as an example of the standard of the magnetic tape cartridge 10. In the following description, although description will be provided on an assumption that the specification shown in Table 1 described below is applied to LTO according to the technique of the present disclosure, this is just an example.

TABLE 1

| Communication Command Classification | ISO14443 Standard | LTO Specification | Technique of Present Disclosure |
|---|---|---|---|
| REQA to SELECT Series | 86 or 91 μs | 86 or 91 μs ("1172/13.56 (MHz)" or "1236/13.56 (MHz)") | Range greater than 86 or 91 μs |
| READ Series | Unspecified | 86 or 91 μs ("1172/13.56 (MHz)" or "1236/13.56 (MHz)") | Range greater than 86 or 92 μs |
| WRITE Series | Unspecified | about 10.02 ms ("135828/13.56 (MHz)" or "135892/13.56 (MHz)") | Range greater than 10.02 ms |

In Table 1, "REQA to SELECT Series" means a polling command described below. In "REQA to SELECT Series", at least a "Request A" command, a "Request SN" command, and a "Select" command are included. "Request A" is a command that inquires a cartridge memory about what type of cartridge memory is. In the embodiment, "Request A" is of one kind; however, the technique of the present disclosure is not limited thereto, and "Request A" may be of a plurality of kinds. "Request SN" is a command that inquires the cartridge memory about a serial number. "Select" is a command that notifies the cartridge memory beforehand of preparation of reading and writing. READ Series is a command corresponding to a read-out command described below. WRITE Series is a command corresponding to a write-in command described below.

As an example, as shown in FIG. 1, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2.

An opening 12B is formed on a front side of a right wall 12A of the case 12. The magnetic tape MT is pulled out from the opening 12B.

Figure 2:
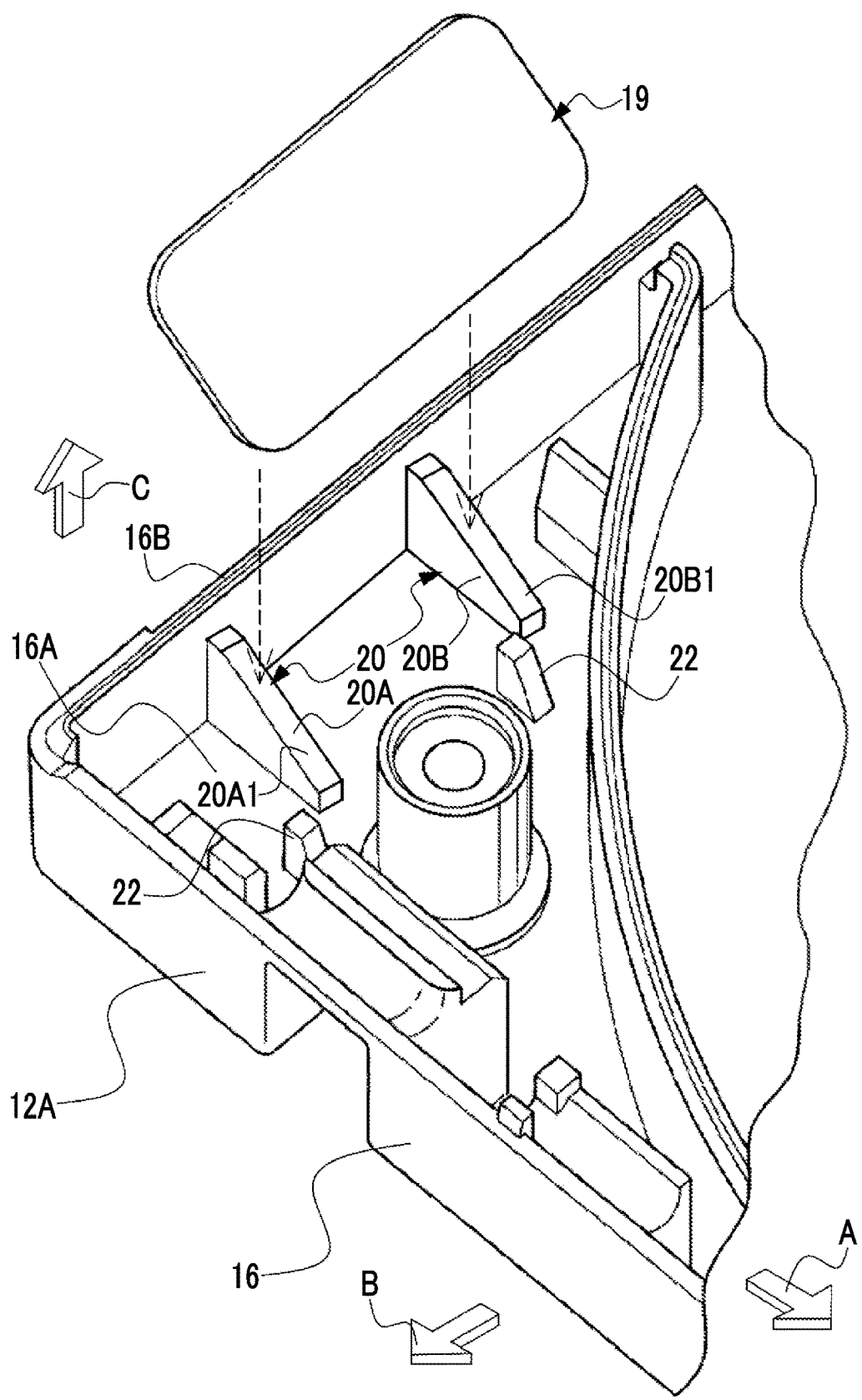
FIG. 2 is a schematic perspective view showing an example of the structure of a rear right end portion inside a lower case of the magnetic tape cartridge according to the embodiment.

As an example, as shown in FIG. 2, a cartridge memory 19 is housed in a rear right end portion of the lower case 16. The cartridge memory 19 is an example of a "noncontact communication medium" according to the technique of the present disclosure. In the embodiment, a so-called passive type RFID tag is employed as the cartridge memory 19.

In the cartridge memory 19, management information 100 (see FIG. 10) is stored. The management information 100 is information for managing the magnetic tape cartridge 10. Examples of the management information 100 include identification information capable of specifying the magnetic tape cartridge 10, a recording capacity of the magnetic tape MT, the outline of information (hereinafter, referred to as "recorded information") recorded on the magnetic tape MT, items of the recorded information, information indicating a recording format of the recorded information, and the like. The management information 100 is an example of "information relating to a magnetic tape" according to the technique of the present disclosure.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external device performs reading and writing of various kinds of information from and to the cartridge memory 19 in a noncontact manner. Although details will be described below, the cartridge memory 19 generates power with electromagnetic application to a magnetic field MF (see FIG. 5) from the external device. Then, the cartridge memory 19 operates using the generated power and performs transfer of various kinds of information with the external device by performing communication with the external device through the magnetic field MF.

As an example, as shown in FIG. 2, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B1, and an inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
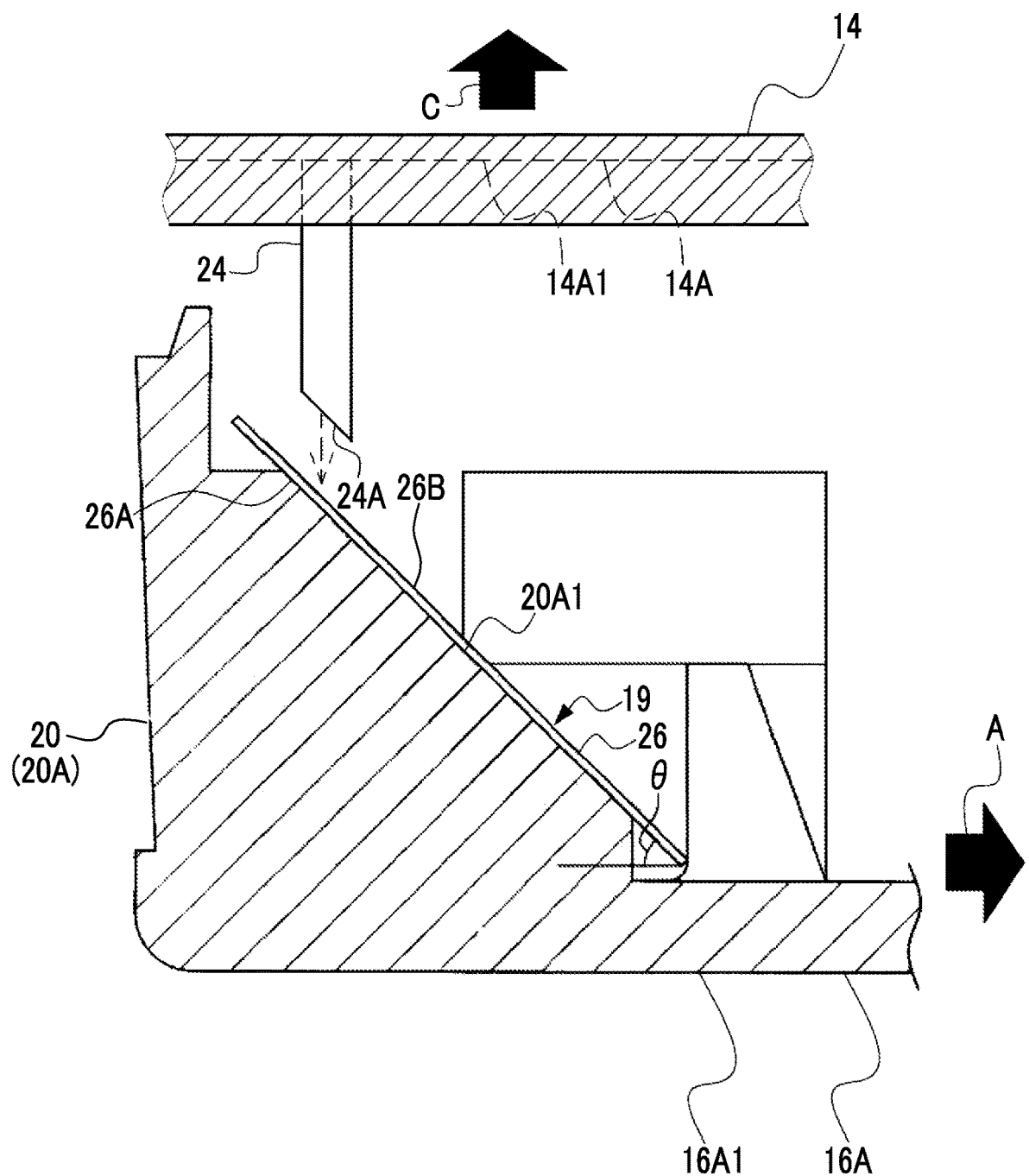
FIG. 3 is a side cross-sectional view showing an example of a support member provided on an inner surface of the lower case of the magnetic tape cartridge according to the embodiment.

As an example, as shown in FIG. 3, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. An inclination angle θ of the support member 20, that is, an inclination angle of each of the inclined surface 20A1 and the inclined surface 20B1 is 45 degrees with respect to the reference surface 16A1.

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1, and a front surface 26B of the substrate 26 is exposed to an inner surface 14A1 side of a top plate 14A.

The upper case 14 comprises a plurality of ribs 24. The plurality of ribs 24 are disposed at intervals in the right-left direction of the case 12. The plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1. That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surface of the support member 20. Thus, a position in an up-down direction of the cartridge memory 19 is restricted by the ribs 24.

Figure 4:
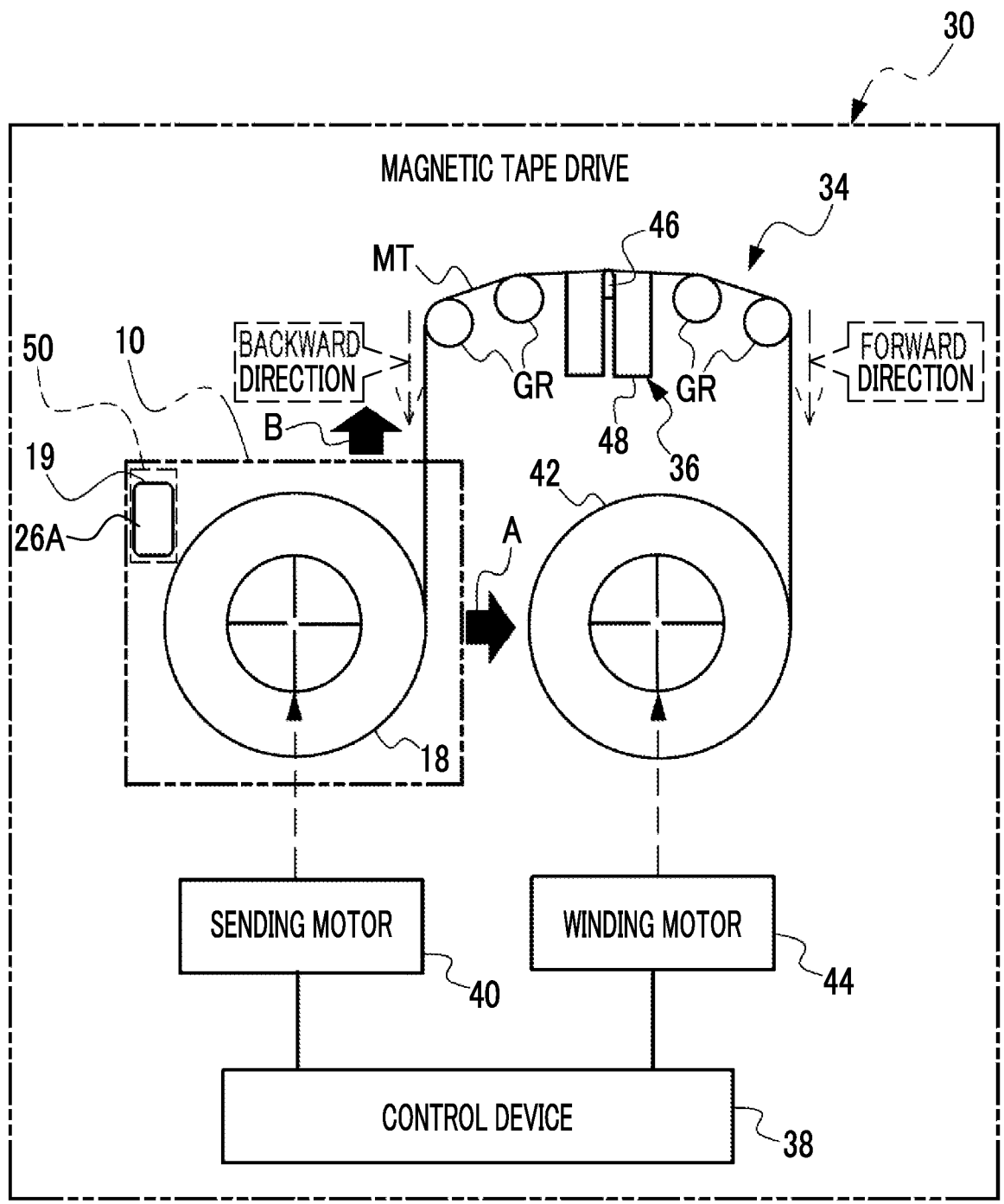
FIG. 4 is a schematic configuration diagram showing an example of the hardware configuration of the magnetic tape drive according to the embodiment.

As an example, as shown in FIG. 4, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear scanning method. In the embodiment, in order words, reading of the recorded information indicates reproduction of the recorded information.

The control device 38 controls the entire magnetic tape drive 30. In the embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an AISC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42, the sending motor 40 is rotated by the control device 38 such that the magnetic tape MT runs in the forward direction. A rotation speed, rotation torque, and the like of the sending motor 40 are adjusted according to a speed of the magnetic tape MT wound around the winding reel 42.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the winding motor 44 is rotated by the control device 38 such that the magnetic tape MT runs in the forward direction. A rotation speed, rotation torque, and the like of the winding motor 44 are adjusted according to the speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from at least one of a computer simulation, a test with a real machine, or the like as a range of tension in which data can be read from the magnetic tape MT by the reading head 36.

In a case where the magnetic tape MT is rewound to the cartridge reel 18, the sending motor 40 and the winding motor 44 are rotated by the control device 38 such that the magnetic tape MT runs in the backward direction.

In the embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 so as to contact the magnetic tape MT during running, and reads recorded information from the magnetic tape MT transported by the transport device 34.

The magnetic tape drive 30 comprises the noncontact reading and writing device 50. The noncontact reading and writing device 50 is an example of an "outside" and a "communication device" according to the technique of the present disclosure. The noncontact reading and writing device 50 is disposed opposite the back surface 26A of the cartridge memory 19 below the magnetic tape cartridge 10 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where reading of the recorded information from the magnetic tape MT by the reading head 36 starts.

Figure 5:
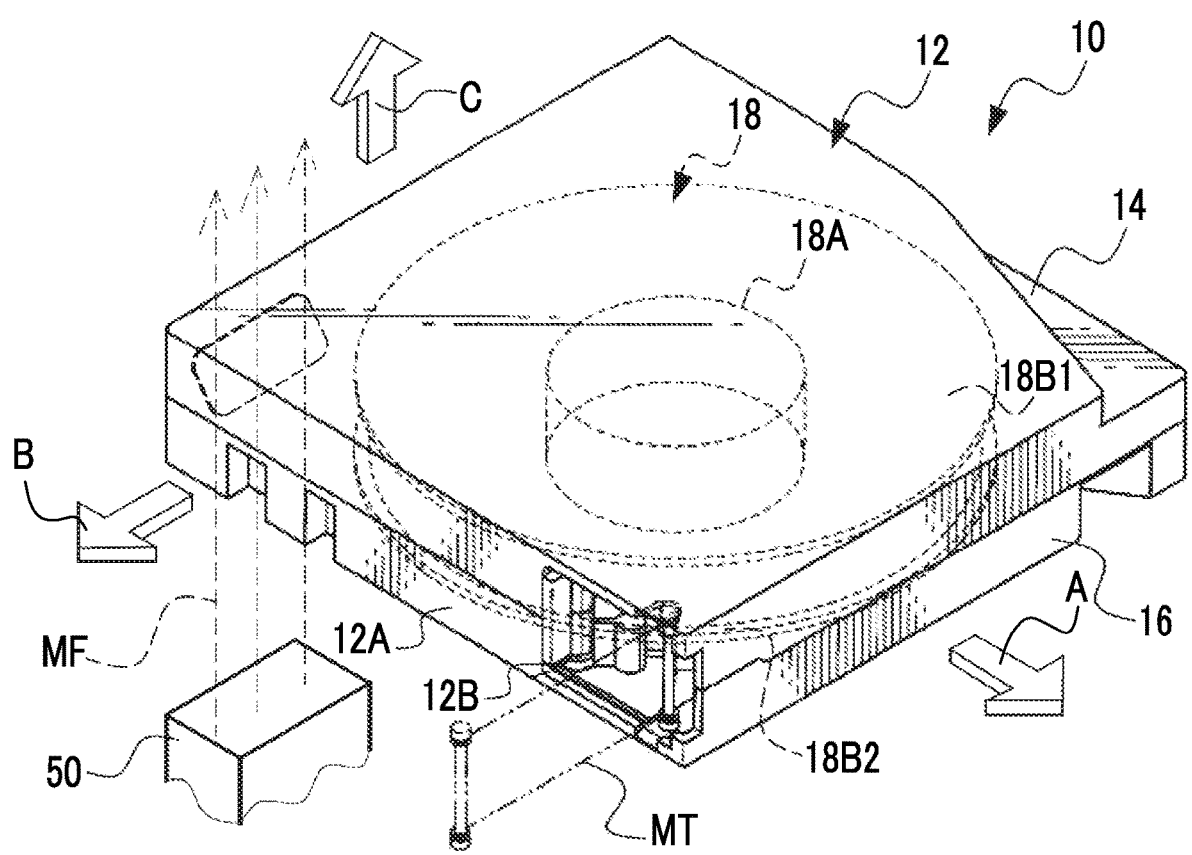
FIG. 5 is a schematic perspective view showing an example of an aspect in which a magnetic field is discharged from a lower side of the magnetic tape cartridge according to the embodiment by a noncontact reading and writing device.

As an example, as shown in FIG. 5, the noncontact reading and writing device 50 emits a magnetic field MF from the lower side of the magnetic tape cartridge 10 toward the cartridge memory 19. The magnetic field MF passes through the cartridge memory 19. The magnetic field MF is an example of an "external magnetic field" according to the technique of the present disclosure.

Figure 6:
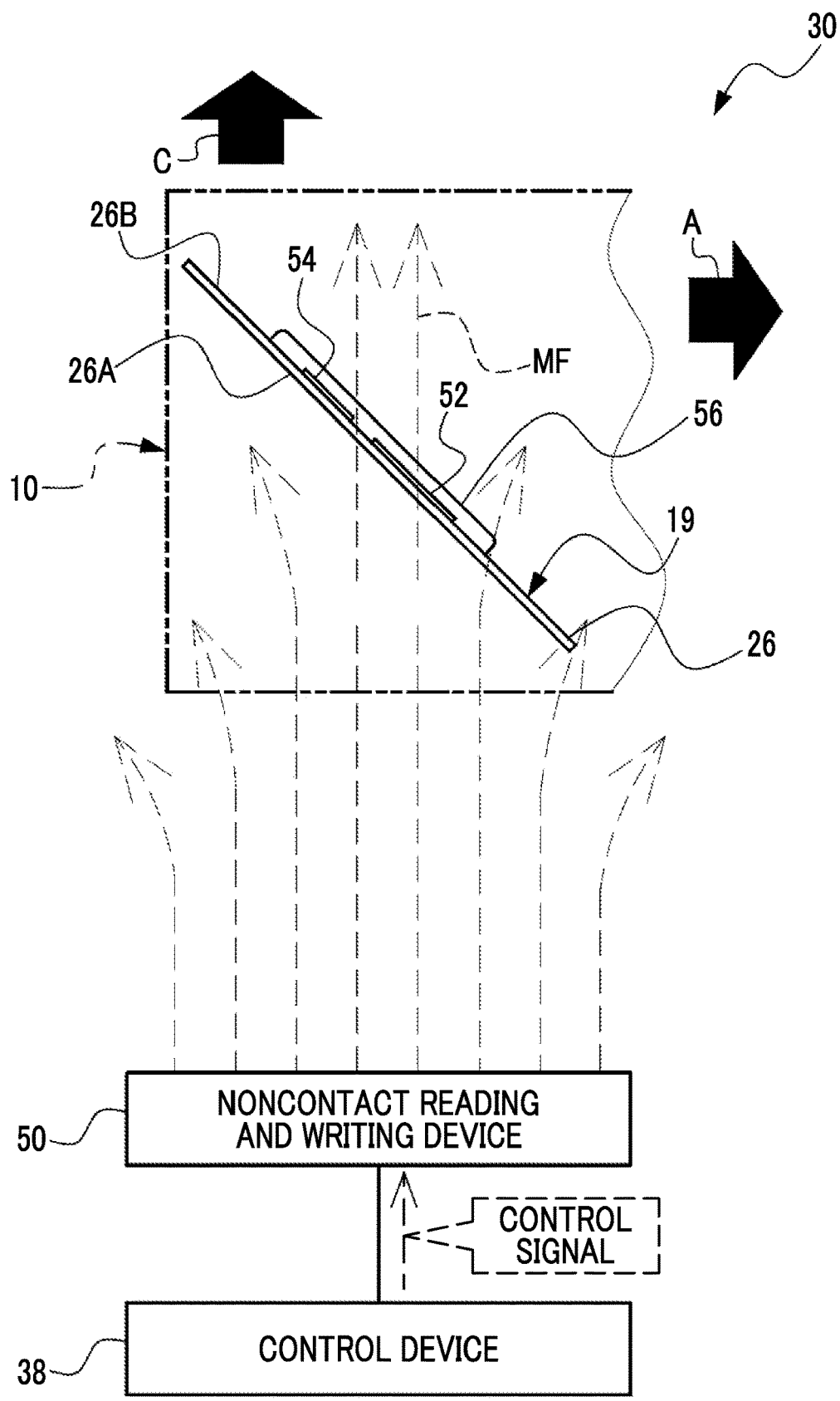
FIG. 6 is a conceptual diagram showing an example of an aspect in which a magnetic field is applied from the noncontact reading and writing device to a cartridge memory in the magnetic tape cartridge according to the embodiment.

As an example, as shown in FIG. 6, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in accordance with the control signal inputted from the control device 38. The magnetic field MF passes through the cartridge memory 19 from the back surface 26A side to the front surface 26B side.

The noncontact reading and writing device 50 spatially transmits a command signal to the cartridge memory 19 under the control of the control device 38. Though described below in detail, the command signal is a signal indicating a command to the cartridge memory 19. In a case where the command signal is spatially transmitted from the noncontact reading and writing device 50 to the cartridge memory 19, the command signal is included in the magnetic field MF in accordance with an instruction from the control device 38 by the noncontact reading and writing device 50. In other words, the command signal is superimposed on the magnetic field MF. That is, the noncontact reading and writing device 50 transmits the command signal to the cartridge memory 19 through the magnetic field MF under the control of the control device 38.

An IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, an ultraviolet curable resin that is cured by ultraviolet rays is employed. The ultraviolet curable resin is merely an example, and a photocurable resin that is cured by light in a wavelength range other than the wavelength range of ultraviolet rays may be used as the sealing material 56, a thermosetting resin may be used as the sealing material 56, or an adhesive may be used as the sealing material 56.

Figure 7:
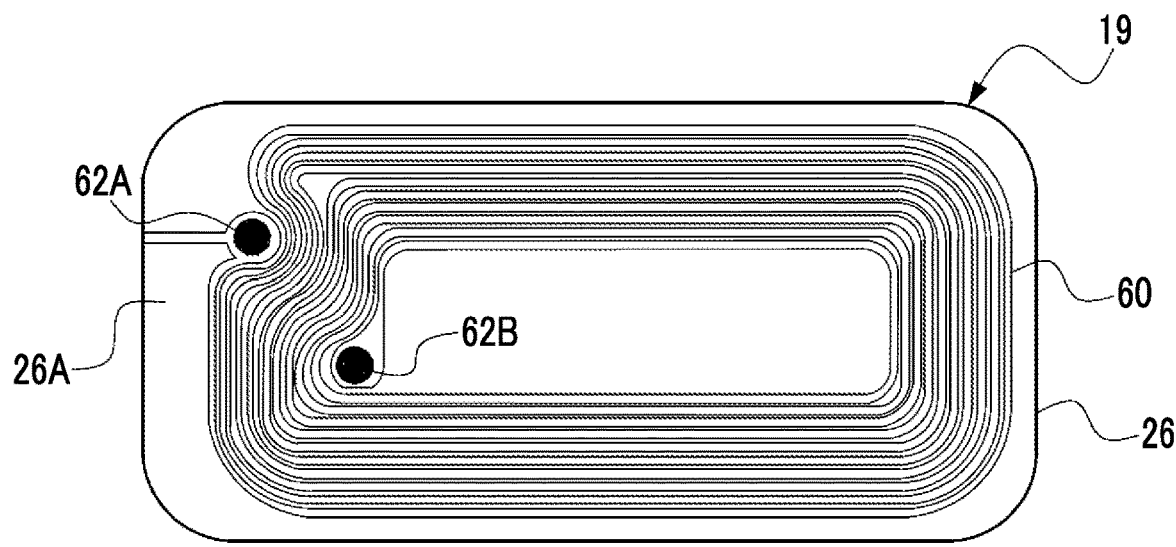
FIG. 7 is a schematic bottom view showing an example of the structure of a back surface of a substrate of the cartridge memory in the magnetic tape cartridge according to the embodiment.

As an example, as shown in FIG. 7, a coil 60 is formed in a loop shape on the back surface 26A of the cartridge memory 19. Here, as a material of the coil 60, copper foil is employed. The copper foil is merely an example, and for example, another kind of conductive material, such as aluminum foil, may be used. The coil 60 induces an induced current with application of the magnetic field MF (see FIGS. 5 and 6) from the noncontact reading and writing device 50.

A first conduction portion 62A and a second conduction portion 62B are provided on the back surface 26A of the cartridge memory 19. The first conduction portion 62A and the second conduction portion 62B have solders and electrically connect both end portions of the coil 60 to the IC chip 52 (see FIGS. 6 and 8) and the capacitor 54 (see FIGS. 6 and 8) on the front surface 26B.

Figure 8:
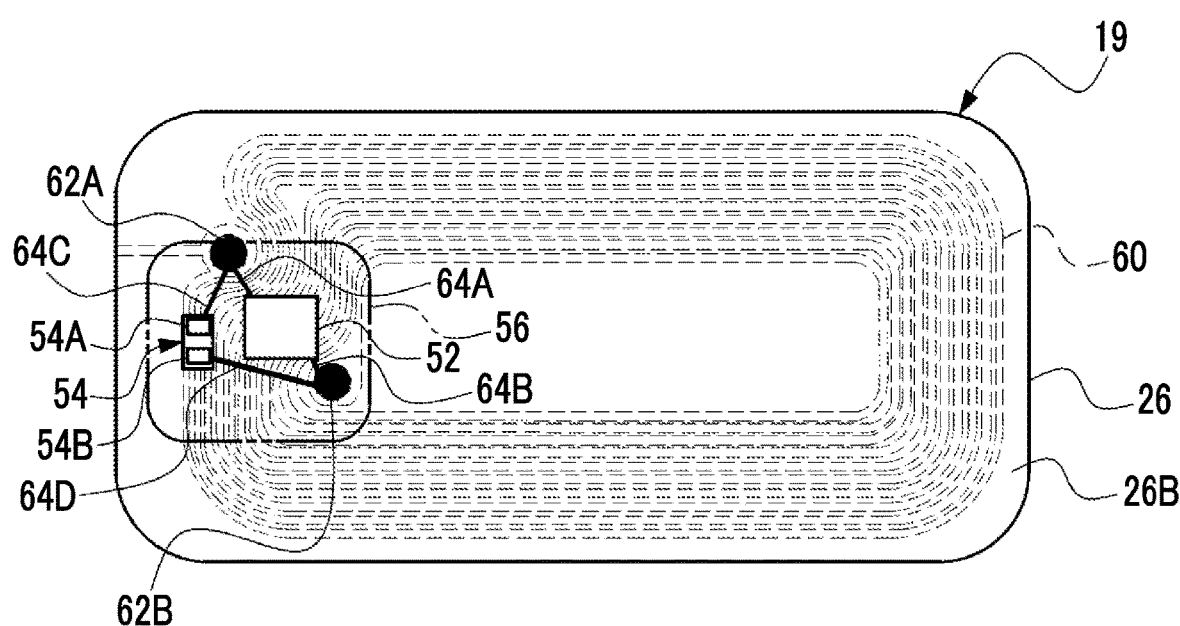
FIG. 8 is a schematic plan view showing an example of the structure of a front surface of the substrate of the cartridge memory in the magnetic tape cartridge according to the embodiment.

As an example, as shown in FIG. 8, on the front surface 26B of the cartridge memory 19, the IC chip 52 and the capacitor 54 are electrically connected to each other using a wired connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. The IC chip 52 and the capacitor 54 are connected in parallel with the coil 60.

Figure 9:
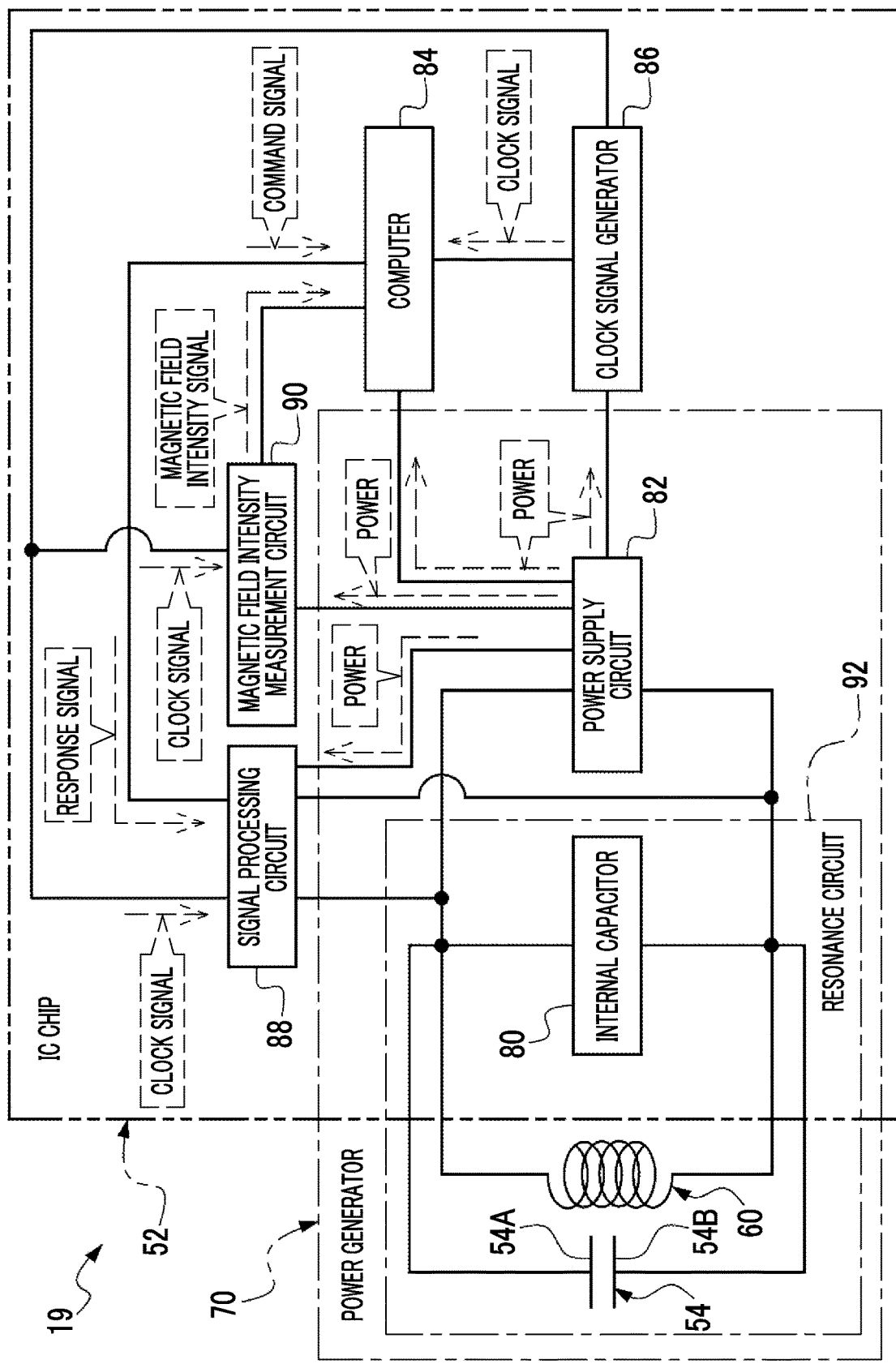
FIG. 9 is a schematic circuit diagram showing an example of the circuit configuration of the cartridge memory in the magnetic tape cartridge according to the embodiment.

As an example, as shown in FIG. 9, the IC chip 52 comprises an internal capacitor 80, a power supply circuit 82, a computer 84, a clock signal generator 86, a signal processing circuit 88, and a magnetic field intensity measurement circuit 90. The IC chip 52 is a general-use IC chip that is usable for purposes other than the magnetic tape cartridge 10, and functions as an arithmetic device for a magnetic tape cartridge in a case where a program for the magnetic tape cartridge is installed thereon. An example of the program for the magnetic tape cartridge is a clock frequency setting processing program 102 described below.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power.

The power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 may not be enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is the same frequency as the frequency of the magnetic field MF, and here, 13.56 MHz is employed. The capacitance of the capacitor 54 is determined based on a measured value of the capacitance of the internal capacitor 80.

The resonance circuit 92 generates an alternating-current power by generating a resonance phenomenon at the resonance frequency determined in advance using the induced current induced by the coil 60 with the magnetic field MF passing through the coil 60 and outputs the generated alternating-current power to the power supply circuit 82.

The power supply circuit 82 has a rectification circuit, a smoothing circuit, and the like. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 82 converts the alternating-current power inputted from the resonance circuit 92 into direct-current power and supplies the converted direct-current power (hereinafter, simply referred to as "power") to various drive elements in the IC chip 52. Examples of various drive elements include the computer 84, the clock signal generator 86, the signal processing circuit 88, and the magnetic field intensity measurement circuit 90. In this way, the power is supplied to the various drive elements in the IC chip 52 by the power generator 70, whereby the IC chip 52 operates using the power generated by the power generator 70.

The computer 84 is an example of a "computer" according to the technique of the present disclosure, and controls the entire cartridge memory 19. The computer 84 holds the management information 100 (see FIG. 10).

The clock signal generator 86 generates a clock signal and outputs the clock signal to various drive elements. The various drive elements operate in accordance with the clock signal inputted from the clock signal generator 86. Although details will be described below, the clock signal generator 86 changes a frequency (hereinafter, referred to as a "clock frequency") of the clock signal in accordance with an instruction of the computer 84. In the clock signal generator 86, the same frequency as the frequency of the magnetic field MF is used as a clock frequency (hereinafter, referred to as a "reference clock frequency") to be a reference, and clock signals of different clock frequencies are generated based on the reference clock frequency. In the embodiment, the clock signal generator 86 selectively generates clock signals of a first frequency and a second frequency. The first frequency is the same frequency as the reference clock frequency, and the second frequency is a ½ frequency of the reference clock frequency.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command signal from the magnetic field MF received by the coil 60 and outputs the command signal to the computer 84. The computer 84 outputs a response signal to the command signal to the signal processing circuit 88. That is, the computer 84 executes processing according to the command signal inputted from the signal processing circuit 88 and outputs a processing result as a response signal to the signal processing circuit 88. In the signal processing circuit 88, in a case where the response signal is inputted from the computer 84, the encoding circuit of the signal processing circuit 88 encodes the response signal to modulate the response signal and outputs the response signal to the resonance circuit 92. The resonance circuit 92 transmits the response signal inputted from the encoding circuit of the signal processing circuit 88 to the noncontact reading and writing device 50 through the magnetic field MF. That is, in a case where the response signal is transmitted from the cartridge memory 19 to the noncontact reading and writing device 50, the response signal is included in the magnetic field MF. In other words, the response signal is superimposed on the magnetic field MF.

The magnetic field intensity measurement circuit 90 measures the intensity of the magnetic field MF based on the power generated by the power supply circuit 82. The power generated by the power supply circuit 82 becomes greater within a limit range as the intensity of the magnetic field MF applied to the resonance circuit 92 is greater. The magnetic field intensity measurement circuit 90 outputs a signal at an output level according to the power generated by the power supply circuit 82 based on a correlation between the power generated by the power supply circuit 82 and the intensity of the magnetic field MF applied to the resonance circuit 92. That is, the magnetic field intensity measurement circuit 90 measures the power generated by the power supply circuit 82, generates a magnetic field intensity signal indicating the intensity of the magnetic field MF based on a measurement result, and outputs the magnetic field intensity signal to the computer 84. The computer 84 can execute processing according to the magnetic field intensity signal inputted from the magnetic field intensity measurement circuit 90.

Figure 10:
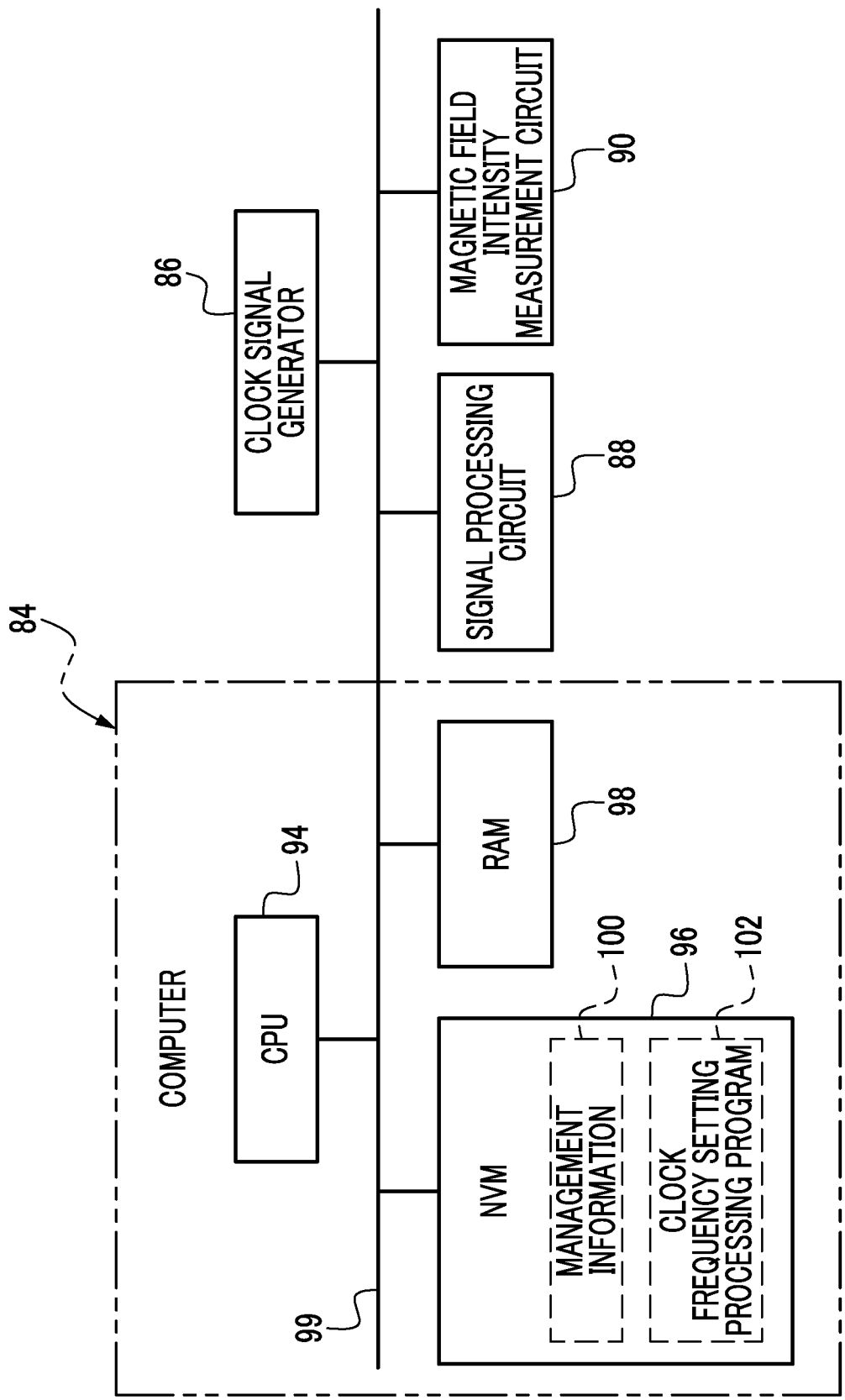
FIG. 10 is a block diagram showing an example of the hardware configuration of a computer of an IC chip that is mounted on the cartridge memory in the magnetic tape cartridge according to the embodiment.

As an example, as shown in FIG. 10, the computer 84 comprises a CPU 94, an NVM 96, and a RAM 98. The CPU 94, the NVM 96, and the RAM 98 are connected to a bus 99. The clock signal generator 86, the signal processing circuit 88, and the magnetic field intensity measurement circuit 90 are also connected to the bus 99.

The NVM 96 is an example of a "first memory" and a "second memory" according to the technique of the present disclosure. Here, as the NVM 96, an EEPROM is employed. The EEPROM is merely an example, and for example, a ferroelectric memory may be used instead of the EEPROM or any memory may be used as long as the memory is a nonvolatile memory that can be mounted on the IC chip 52.

The management information 100 is stored in the NVM 96. The management information 100 is an example of "information" according to the technique of the present disclosure. The CPU 94 selectively executes polling processing, read-out processing, and write-in processing according to the command signal inputted from the signal processing circuit 88.

The command indicated by the command signal is a polling command, a read-out command, or a write-in command. In a case where the command indicated by the command signal is the polling command, the CPU 94 executes the polling processing. In a case where the command indicated by the command signal is the read-out command, the CPU 94 executes the read-out processing. In a case where the command indicated by the command signal is the write-in command, the CPU 94 executes the write-in processing. In the following description, for convenience of description, description will be provided on an assumption that the command indicated by the command signal is any one of the polling command, the read-out command, or the write-in command. Here, for convenience of description, although one kind of signal has been exemplified as a polling signal, the polling signal may be a plurality of kinds of signals.

The polling processing is processing of establishing communication with the noncontact reading and writing device 50, and is executed, for example, as preparation processing in a pre-stage of the read-out processing and the write-in processing. The read-out processing is processing of reading out the management information 100 and the like from the NVM 96. The write-in processing is processing of writing the management information 100 and the like in the NVM 96. All of the polling processing, the read-out processing, and the write-in processing (hereinafter, referred to as various kinds of processing in a case where there is no need for distinction) are executed by the CPU 94 in accordance with the clock signals generated by the clock signal generator 86. That is, the CPU 94 executes various kinds of processing at processing speeds according to the clock frequencies.

Accordingly, as the clock frequency is higher, the processing speed increases. The increase in the processing speed causes an increase in load imposed on the CPU 94 and an increase in power consumption. As an amount of information, such as the management information 100, becomes greater, an execution time of the read-out processing and the write-in processing by the CPU 94 becomes longer, and there is a concern that the power supplied from the power supply circuit 82 to the CPU 94 and the like is deficient. To avoid the occurrence of such a situation, in the cartridge memory 19, clock frequency setting processing is executed by the CPU 94. The clock frequency setting processing is processing of making the clock frequency lower as the intensity of the magnetic field MF is smaller. Hereinafter, the clock frequency setting processing will be described.

In the NVM 96, the clock frequency setting processing program 102 is stored. The CPU 94 reads out the clock frequency setting processing program 102 from the NVM 96 and executes the clock frequency setting processing program 102 on the RAM 98. The clock frequency setting processing is realized by the clock frequency setting processing program 102 being executed by the CPU 94.

Figure 11:
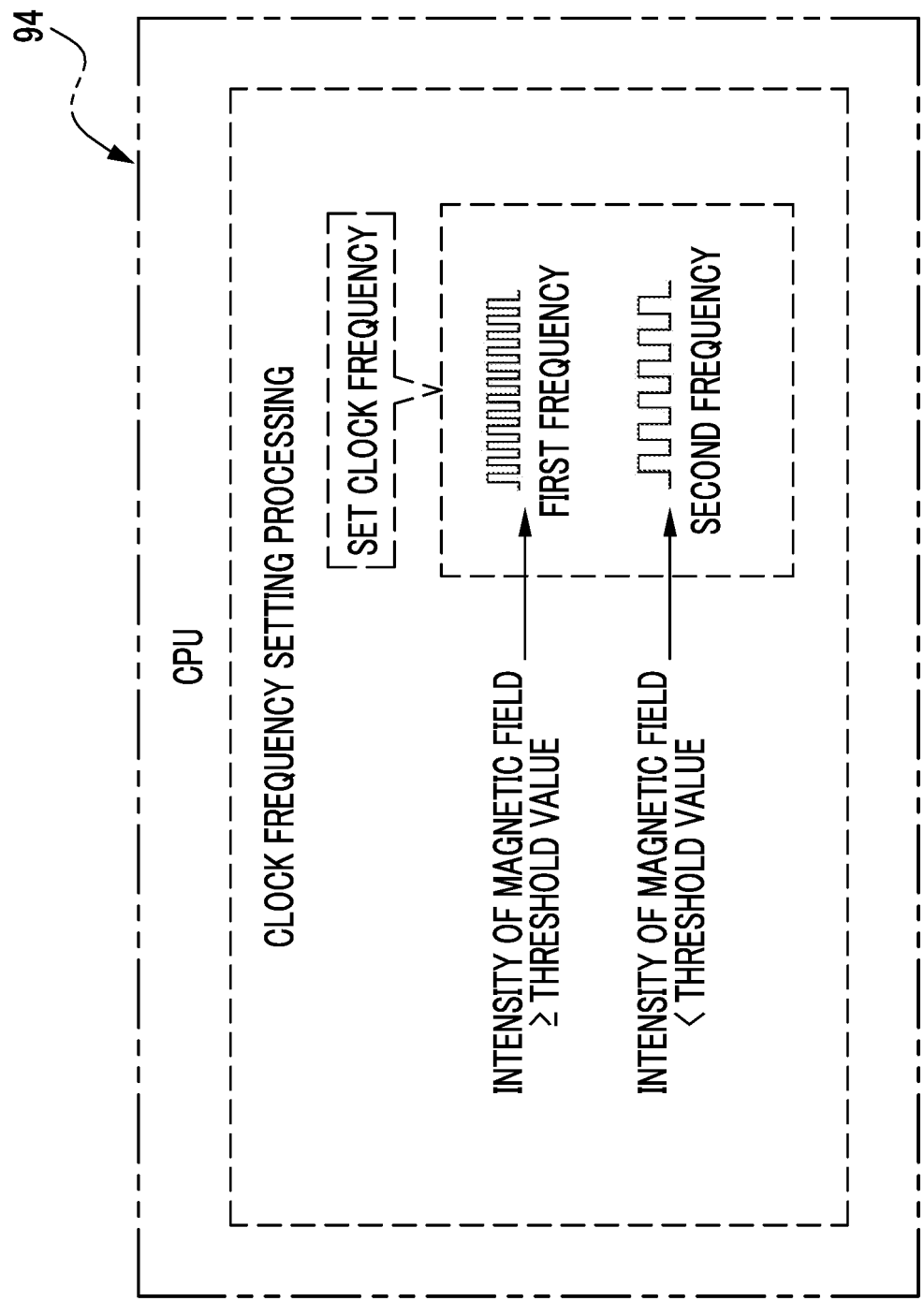
FIG. 11 is a conceptual diagram showing an example of processing content of clock frequency setting processing that is executed by a CPU of the cartridge memory in the magnetic tape cartridge according to the embodiment.

As an example, as shown in FIG. 11, the CPU 94 executes the clock frequency setting processing to set the clock frequency according to the intensity of the magnetic field MF. Specifically, the CPU 94 makes the clock frequency lower as the intensity of the magnetic field MF is smaller.

More specifically, the CPU 94 has a threshold value and determines whether or not the intensity of the magnetic field MF indicated by the magnetic field intensity signal inputted from the magnetic field intensity measurement circuit 90 is equal to or greater than the threshold value. Here, the threshold value is a fixed value derived in advance by at least one of a test with a real machine, a computer simulation, or the like as the intensity of the magnetic field MF suitable for changing the clock frequency from one of the first frequency and the second frequency to the other frequency. Here, although the fixed value has been exemplified, the technique of the present disclosure is not limited thereto, and a variable value that is changed according to a condition to be applied may be used.

The CPU 94 sets the first frequency as the clock frequency in a case where the intensity of the magnetic field MF is equal to or greater than the threshold value, and sets the second frequency as the clock frequency in a case where the intensity of the magnetic field MF is less than the threshold value. That is, the CPU 94 performs control on the clock signal generator 86 such that the clock signal generator 86 generates the clock signal of the first frequency in a case where the intensity of the magnetic field MF is equal to or greater than the threshold value, and performs control on the clock signal generator 86 such that the clock signal generator 86 generates the clock signal of the second frequency in a case where the intensity of the magnetic field MF is less than the threshold value.

Next, the operation of the cartridge memory 19 will be described referring to FIG. 12.

Figure 12:
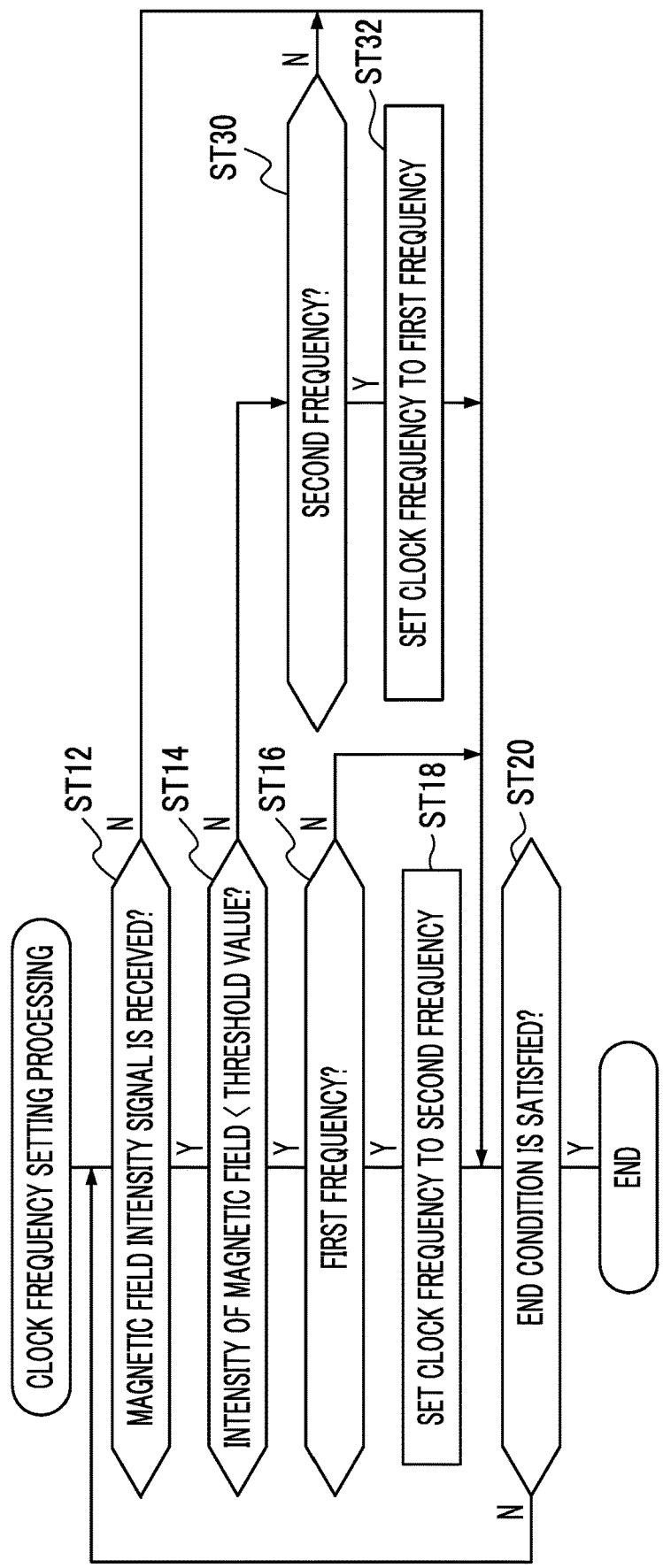
FIG. 12 is a flowchart showing an example of a flow of the clock frequency setting processing according to the embodiment.

FIG. 12 shows an example of a flow of the clock frequency setting processing that is executed by the CPU 94. In the following description, for convenience of description, description will be provided on an assumption that power is supplied from the power supply circuit 82 to the various drive elements. In the clock frequency setting processing shown in FIG. 12, for convenience of description, it is assumed that various drive elements operate in accordance with the first frequency or the second frequency.

In the clock frequency setting processing shown in FIG. 12, first, in Step ST12, the CPU 94 determines whether or not the magnetic field intensity signal is received from the magnetic field intensity measurement circuit 90. In Step ST12, in a case where the magnetic field intensity signal is not received from the magnetic field intensity measurement circuit 90, negative determination is made, and the clock frequency setting processing goes to Step ST20. In Step ST12, in a case where the magnetic field intensity signal is received from the magnetic field intensity measurement circuit 90, affirmative determination is made, and the clock frequency setting processing goes to Step ST14.

In Step ST14, the CPU 94 determines whether or not the intensity of the magnetic field MF indicated by the magnetic field intensity signal received in Step ST12 falls below the threshold value. In Step ST14, in a case where the intensity of the magnetic field MF is equal to or greater than the threshold value, negative determination is made, and the clock frequency setting processing goes to Step ST30. In Step ST14, in a case where the intensity of the magnetic field MF falls below the threshold value, affirmative determination is made, and the clock frequency setting processing goes to Step ST16.

In Step ST30, the CPU 94 determines whether or not the clock frequency is the second frequency. In Step ST30, in a case where the clock frequency is the first frequency, negative determination is made, and the clock frequency setting processing goes to Step ST20. In Step ST30, in a case where the clock frequency is the second frequency, affirmative determination is made, and the clock frequency setting processing goes to Step ST32.

In Step ST32, the CPU 94 sets the clock frequency to the first frequency, and thereafter, the clock frequency setting processing goes to Step ST20.

In Step ST16, the CPU 94 determines whether or not the clock frequency is the first frequency. In Step ST16, in a case where the clock frequency is the second frequency, negative determination is made, and the clock frequency setting processing goes to Step ST20. In Step ST16, in a case where the clock frequency is the first frequency, affirmative determination is made, and the clock frequency setting processing goes to Step ST18.

In Step ST18, the CPU 94 sets the clock frequency to the second frequency, and thereafter, the clock frequency setting processing goes to Step ST20.

In Step ST20, determination is made whether or not a condition (hereinafter, referred to as a "clock frequency setting processing end condition") for ending the clock frequency setting processing is satisfied. Examples of the clock frequency setting processing end condition include a condition that the magnetic field MF has disappeared. Determination on whether or not the magnetic field MF has disappeared is performed by the CPU 94 based on a magnetic field intensity signal inputted from the magnetic field intensity measurement circuit 90 to the CPU 94. In Step ST20, in a case where the clock frequency setting processing end condition is not satisfied, negative determination is made, and the clock frequency setting processing goes to Step ST12. In Step ST20, in a case where the clock frequency setting processing end condition is satisfied, affirmative determination is made, and the clock frequency setting processing ends.

As described above, in the cartridge memory 19, in a case where the intensity of the magnetic field MF falls below the threshold value, the clock frequency is set to the second frequency by the CPU 94. Thus, the clock signal of the second frequency is generated by the clock signal generator 86. The second frequency is lower than the first frequency. That is, as the intensity of the magnetic field MF is smaller, the clock frequency becomes lower. Since the second frequency does not have the clock frequency of "0", the CPU 94 can execute the processing according to the command signal at the second frequency. As the clock frequency becomes lower, power consumption in the CPU 94 is reduced. Accordingly, with this configuration, it is possible to realize both stabilization of the operation of the cartridge memory 19 and reduction in power consumption.

In the cartridge memory 19, the response signal indicating the processing result obtained by the execution of the processing according to the command signal by the CPU 94 is transmitted to the noncontact reading and writing device 50 through the magnetic field MF. Accordingly, with this configuration, it is possible to transmit the processing result to the noncontact reading and writing device 50 even though a magnetic field different from the magnetic field MF is not applied to the coil 60.

In the above-described embodiment, although an aspect where the clock frequency setting processing is executed by the CPU 94 regardless of a period during which the processing according to the command signal is executed by the CPU 94 has been described, the technique of the present disclosure is not limited thereto. For example, the clock frequency setting processing may be executed by the CPU 94 except for a period (hereinafter, referred to as a "processing period") during which the processing according to the command signal is executed by the CPU 94. Here, except for the processing period indicates, for example, a period between the polling processing and the read-out processing, a period between the polling processing and the write-in processing, and a period between the read-out processing and the write-in processing.

Figure 13:
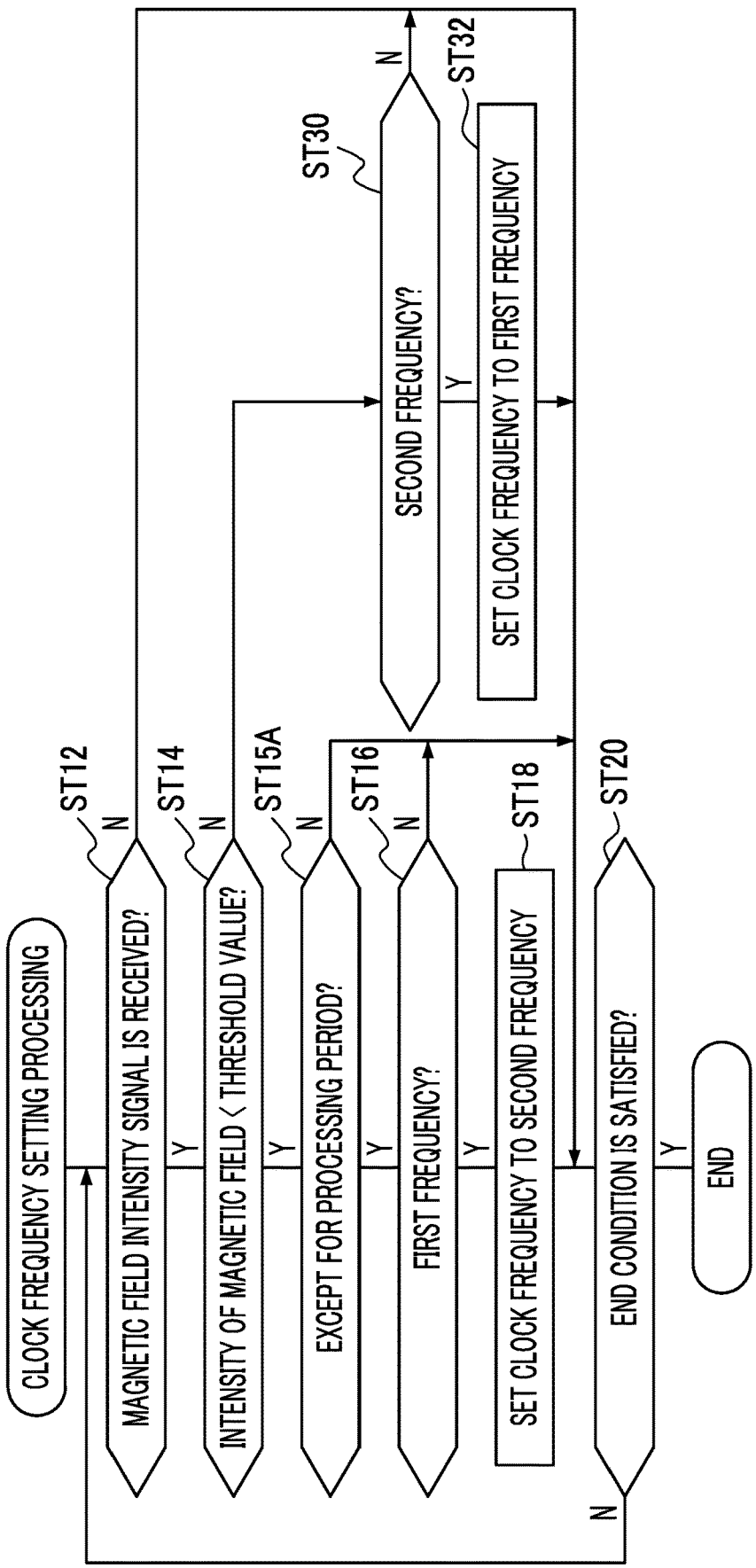
FIG. 13 is a flowchart showing a flow of processing of a first modification example of the clock frequency setting processing according to the embodiment.

In this case, as an example, clock frequency setting processing shown in FIG. 13 is executed by the CPU 94. The clock frequency setting processing shown in FIG. 13 is different from the clock frequency setting processing shown in FIG. 12 in that Step ST15A is provided between Steps ST14 and ST16.

In Step ST15A of the clock frequency setting processing shown in FIG. 13, the CPU 94 determines whether or not the present time is except for the processing period. That is, the CPU 94 determines whether or not the processing on the command signal is executed at the present time. In Step ST15A, in a case where the present time is within the processing period, that is, in a case where the processing on the command signal is executed by the CPU 94, negative determination is made, and the clock frequency setting processing goes to Step ST20. In Step ST15A, in a case where the present time is except for the processing period, that is, in a case where the processing on the command signal is not executed by the CPU 94, affirmative determination is made, and the clock frequency setting processing goes to Step ST16.

Since the processing after Step ST16 is executed by the CPU 94, on a condition that the present time is except for the processing period and the second frequency is set as the clock frequency, the clock frequency is set to the second frequency by the CPU 94. Accordingly, with this configuration, it is possible to reduce power consumption, as compared to a case where the clock signal of the first frequency is continuously generated even in a period during which the processing on the command signal is not executed. Specifically, it is possible to reduce power consumption, as compared to a case where the clock signal of the first frequency is continuously generated even in the period between the polling processing and the read-out processing, the period between the polling processing and the write-in processing, and the period between the read-out processing and the write-in processing.

Here, although an aspect where the second frequency is set as the clock frequency in the period (hereinafter, referred to as a "first period") between the polling processing and the read-out processing, the period (hereinafter, referred to as a "second period") between the polling processing and the write-in processing, and the period (hereinafter, referred to as a "third period") between the read-out processing and the write-in processing has been exemplified, the technique of the present disclosure is not limited thereto, and the clock frequency may be set to the second frequency by the CPU 94 in one period or two periods of the first period, the second period, and the third period.

In the above-described embodiment, although an aspect where the clock frequency is changed from the first frequency to the second frequency on a condition that the intensity of the magnetic field MF falls below the threshold value regardless of the kind of the command indicated by the command signal has been described, the technique of the present disclosure is not limited thereto. That is, the clock frequency may be changed by the CPU 94 according to the kind of the command indicated by the command signal.

In this case, as an example, clock frequency setting processing shown in FIG. 14 is executed by the CPU 94. In the example shown in FIG. 14, the CPU 94 executes the clock frequency setting processing to selectively set a first frequency, a second frequency, and a third frequency as the clock frequency. The third frequency is a ¼ frequency of the reference clock frequency, that is, a ½ frequency of the second frequency, and a level relationship of the clock frequencies is "first frequency>second frequency>third frequency".

The CPU 94 sets the first frequency as the clock frequency in a case where the intensity of the magnetic field MF is equal to or greater than the threshold value, and selectively sets the second frequency and the third frequency as the clock frequency according to the kind of the command signal in a case where the intensity of the magnetic field MF is less than the threshold value.

The CPU 94 sets the second frequency as the clock frequency in a case where the intensity of the magnetic field MF is less than the threshold value, and the command indicated by the command signal is the read-out command or the write-in command. The CPU 94 sets the third frequency as the clock frequency in a case where the intensity of the magnetic field MF is less than the threshold value, and the command indicated by the command signal is the polling command.

Figure 15A:
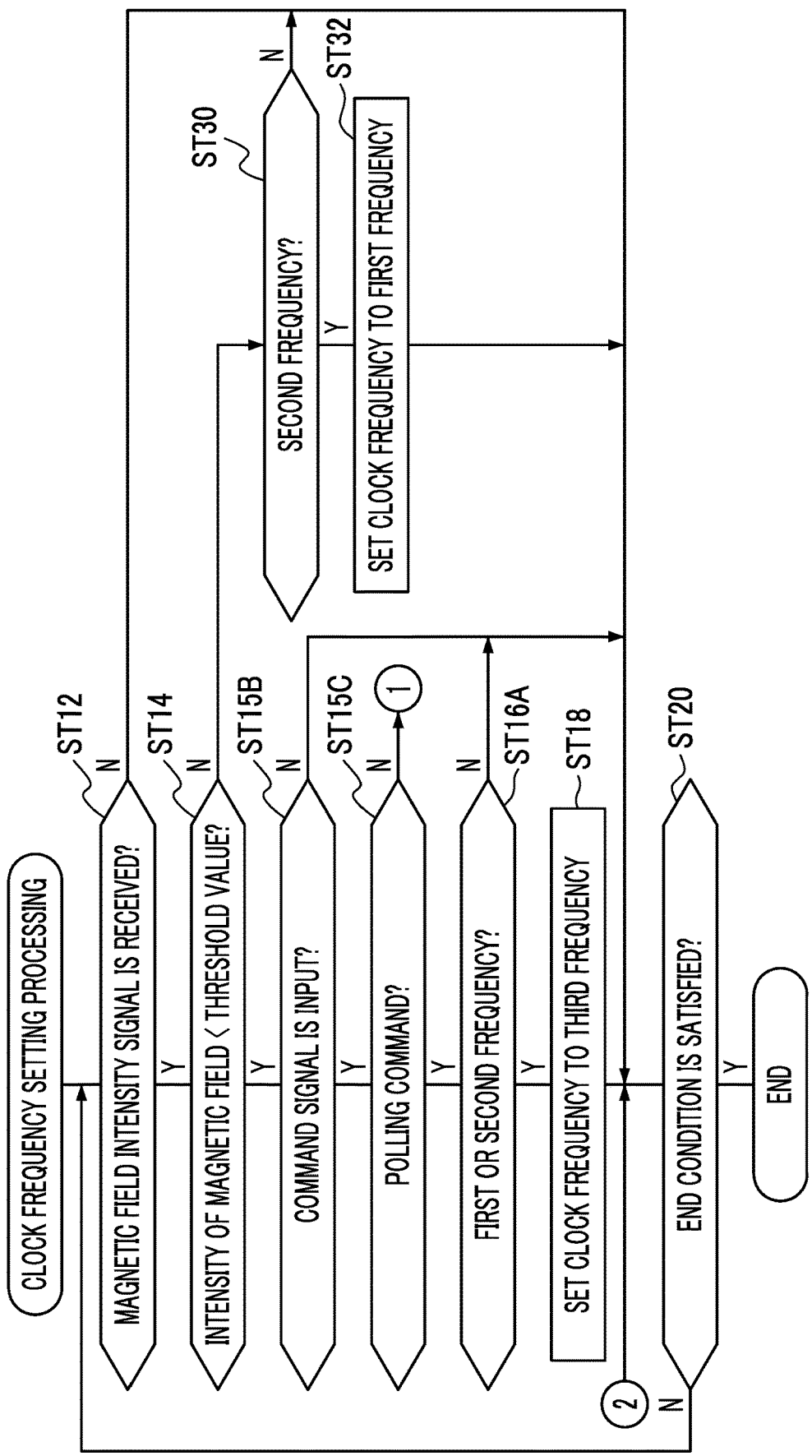
FIG. 15A is a flowchart showing a flow of processing of the second modification example of the clock frequency setting processing according to the embodiment.
Figure 15B:
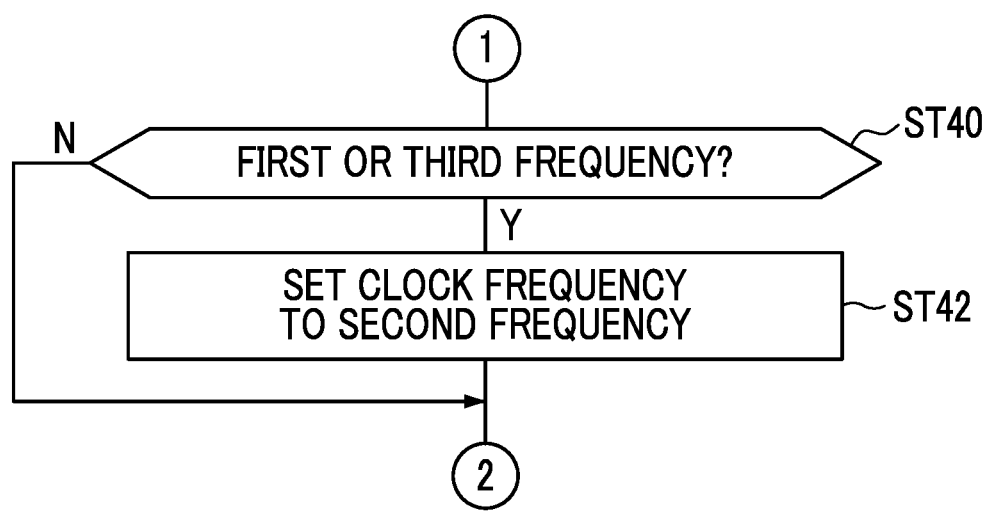
FIG. 15B is a continuation of the flowchart shown in FIG. 15A.

FIGS. 15A and 15B show an example of a flow of the clock frequency setting processing shown in FIG. 14. The clock frequency setting processing shown in FIGS. 15A and 15B is different from the clock frequency setting processing shown in FIG. 12 in that Step ST16A is provided instead of Step ST16, Steps ST15B and ST15C are provided between Steps ST14 and ST16A, Step ST40 is provided instead of Step ST30, and Step ST42 is provided instead of Step ST32.

In Step ST15B of the clock frequency setting processing shown in FIG. 15A, the CPU 94 determines whether or not the command signal is inputted from the signal processing circuit 88. In Step ST15B, in a case where the command signal is not inputted from the signal processing circuit 88, negative determination is made, and the clock frequency setting processing goes to Step ST20. In Step ST15B, in a case where the command signal is inputted from the signal processing circuit 88, affirmative determination is made, and the clock frequency setting processing goes to Step ST15C.

In Step ST15C, the CPU 94 determines whether or not the command indicated by the command signal inputted in Step ST15B is the polling command. In Step ST15C, in a case where the command indicated by the command signal is not the polling command, that is, in a case where the command indicated by the command signal is the read-out command or the write-in command, negative determination is made, and the clock frequency setting processing goes to Step ST40 shown in FIG. 15B. In Step ST15C, in a case where the command indicated by the command signal is the polling command, affirmative determination is made, and the clock frequency setting processing goes to Step ST16A.

In Step ST16A, the CPU 94 determines whether or not the clock frequency is the first frequency or the second frequency. In Step ST16, in a case where the clock frequency is the third frequency, negative determination is made, and the clock frequency setting processing goes to Step ST20. In Step ST16, in a case where the clock frequency is the first frequency or the second frequency, affirmative determination is made, and the clock frequency setting processing goes to Step ST18.

In Step ST40 shown in FIG. 15B, the CPU 94 determines whether or not the clock frequency is the first frequency or the third frequency. In Step ST40, in a case where the clock frequency is the second frequency, negative determination is made, and the clock frequency setting processing goes to Step ST20 shown in FIG. 15A. In Step ST40, in a case where the clock frequency is the first frequency or the third frequency, affirmative determination is made, and the clock frequency setting processing goes to Step ST42.

In Step ST42, the CPU 94 sets the clock frequency to the second frequency, and thereafter, the clock frequency setting processing goes to Step ST20 shown in FIG. 15A.

In this way, in the clock frequency setting processing shown in FIGS. 15A and 15B, in a case where the intensity of the magnetic field MF is less than the threshold value, and the command indicated by the command signal is the read-out command or the write-in command, the second frequency is set as the clock frequency. In the clock frequency setting processing shown in FIGS. 15A and 15B, in a case where the intensity of the magnetic field MF is less than the threshold value, and the command indicated by the command signal is the polling command, the third frequency is set as the clock frequency. Accordingly, with this configuration, it is possible to prevent excess and deficiency of power and the processing time, as compared to a case where the clock frequency is constantly fixed regardless of the kind of the command indicated by the command signal.

In the above-described embodiment, although an aspect where one clock frequency is set for one polling signal has been exemplified, the technique of the present disclosure is not limited thereto. For example, in a case where the polling signal includes a plurality of instruction signals indicating instructions for the CPU 94, a clock frequency may be lower in a period except for a period (hereinafter, referred to as a "response processing period") during which response processing according to the instruction signal is executed by the CPU 94 than a clock frequency within the response processing period.

In an example shown in FIG. 16, the polling signal includes first to third instruction signals (hereinafter, referred to as "instruction signals" in a case where there is no need for distinction). The first to third instruction signals are sequentially transmitted to the CPU 94 at intervals equal to or greater than a time needed from a processing start to processing completion on the instruction signal by the CPU 94. The first instruction signal is, for example, a signal for inquiring the CPU 94 about the kind of the cartridge memory 19. The second instruction signal is, for example, a signal for inquiring the CPU 94 about a serial number. The third instruction signal is, for example, a signal for requesting preparation of the read-out processing or the write-in processing.

The clock frequency setting processing is executed by the CPU 94, whereby the third frequency is set as the clock frequency by the CPU 94 within the response processing period, and a fourth frequency is set as the clock frequency by the CPU 94 in the period except for the response processing period. The fourth frequency is a ⅛ frequency of the reference clock frequency, that is, a ½ frequency of the third frequency, and a level relationship of the clock frequencies is "first frequency>second frequency>third frequency>fourth frequency". That is, the clock frequency is set lower in the period except for the response processing period than within the response processing period.

Figure 16:
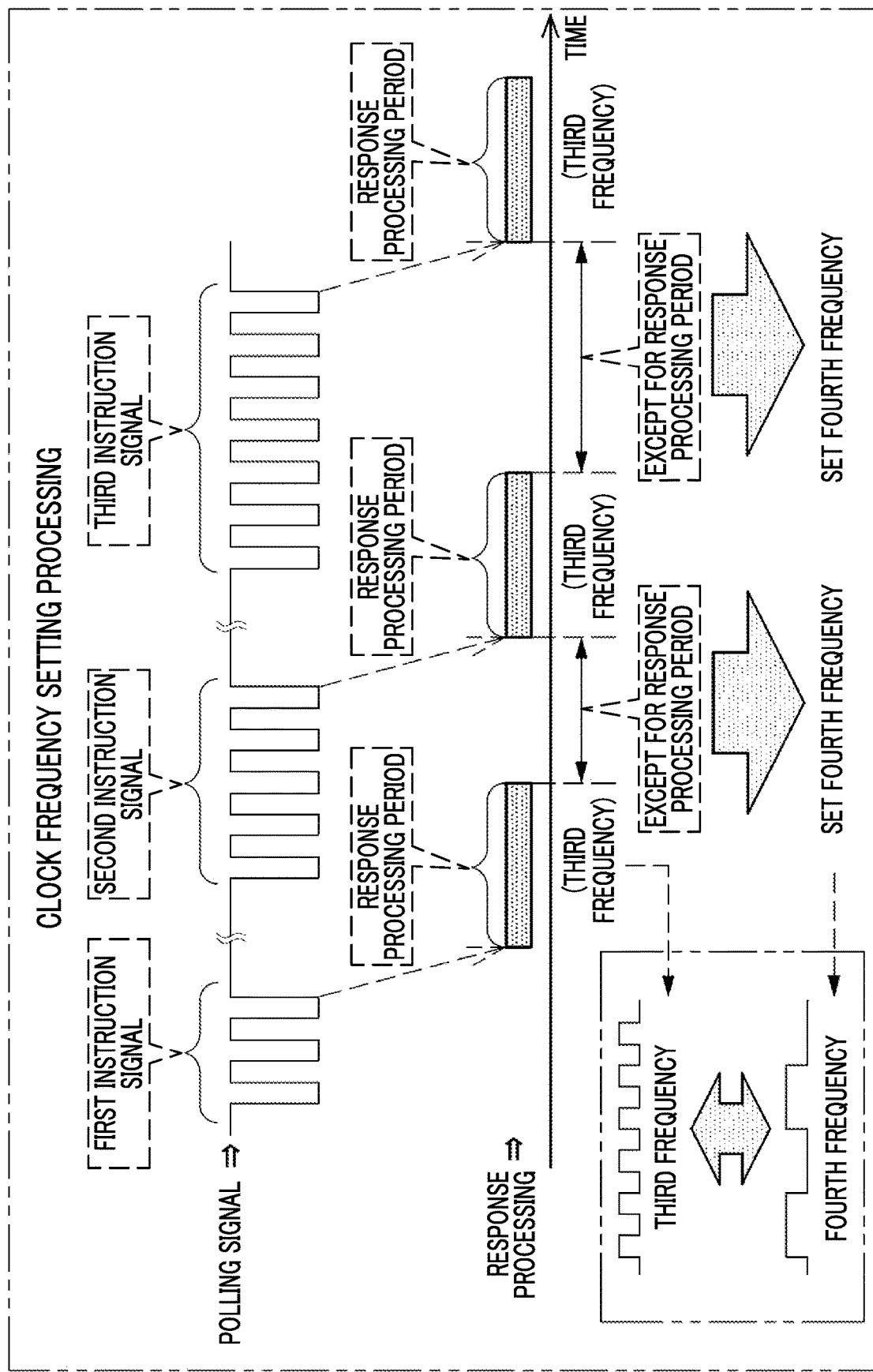
FIG. 16 is a conceptual diagram showing a third modification example of the clock frequency setting processing according to the embodiment.
Figure 17:
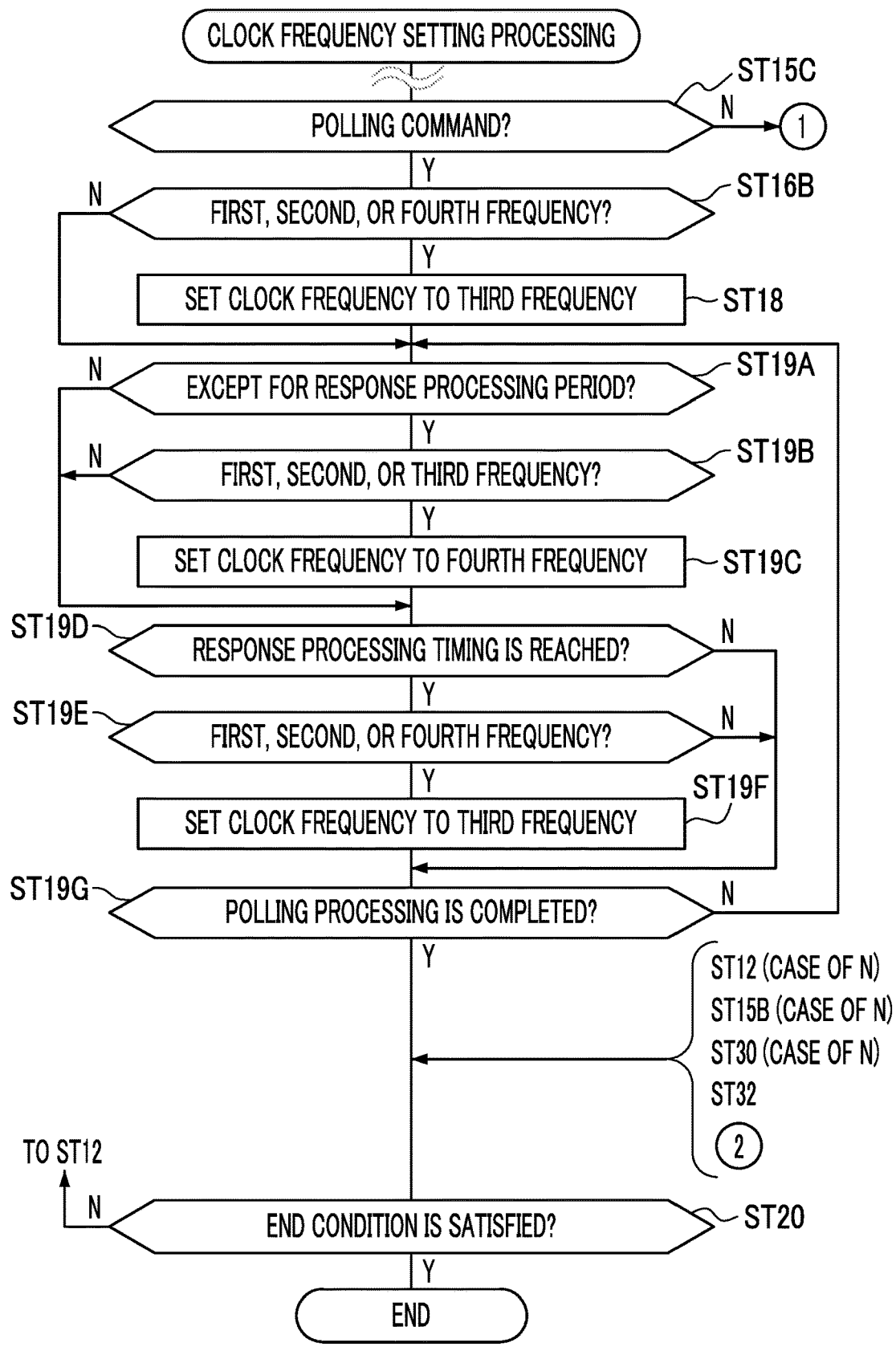
FIG. 17 is a flowchart showing a flow of processing of the third modification example of the clock frequency setting processing according to the embodiment.

FIG. 17 shows an example of a flow of the clock frequency setting processing shown in FIG. 16. The clock frequency setting processing shown in FIG. 17 is different from the clock frequency setting processing shown in FIGS. 15A and 15B in that Step ST16B is provided instead of Step ST16A, and Steps ST19A to ST19G are provided between Steps ST18 and ST20.

In the clock frequency setting processing shown in FIG. 17, in Step ST16B, the CPU 94 determines whether or not the clock frequency is the first frequency, the second frequency, or the fourth frequency. In Step ST16B, in a case where the clock frequency is the third frequency, negative determination is made, and the clock frequency setting processing goes to Step ST19A. In Step ST16B, in a case where the clock frequency is the first frequency, the second frequency, or the fourth frequency, affirmative determination is made, and the clock frequency setting processing goes to Step ST18.

In Step ST19A, the CPU 94 determines whether or not the present time is in the period except for the response processing period. Determination on whether or not the present time is in the period except for the response processing period is performed by determination on whether or not the processing according to the instruction signal included in the polling signal is not executed by the CPU 94 at the present time. In Step ST19A, in a case where the present time is within the response processing period, negative determination is made, and the clock frequency setting processing goes to Step ST19D. In Step ST19A, in a case where the present time is in the period except for the response processing period, affirmative determination is made, and the clock frequency setting processing goes to Step ST19B.

In Step ST19B, the CPU 94 determines whether or not the clock frequency is the first frequency, the second frequency, or the third frequency. In Step ST19B, in a case where the clock frequency is not either the first frequency, the second frequency, or the third frequency, that is, in a case where the clock frequency is the fourth frequency, negative determination is made, and the clock frequency setting processing goes to Step ST19D. In Step ST19B, in a case where the clock frequency is the first frequency, the second frequency, or the third frequency, affirmative determination is made, and the clock frequency setting processing goes to Step ST19C.

In Step ST19C, the CPU 94 sets the clock frequency to the fourth frequency, and thereafter, the clock frequency setting processing goes to Step ST19D.

In Step ST19D, the CPU 94 determines whether or not a timing (hereinafter, referred to as a "response processing timing") at which the response processing on the instruction signal is executed is reached. The response processing timing indicates, for example, a timing at which the instruction signal is inputted to the CPU 94. In Step ST19D, in a case where the response processing timing is not reached, negative determination is made, and the clock frequency setting processing goes to Step ST19G. In Step ST19D, in a case where the response processing timing is reached, affirmative determination is made, and the clock frequency setting processing goes to Step ST19E.

In Step ST19E, determination is made whether or not the clock frequency is the first frequency, the second frequency, or the fourth frequency. In Step ST19E, in a case where the clock frequency is not either the first frequency, the second frequency, or the fourth frequency, that is, in a case where the clock frequency is the third frequency, negative determination is made, and the clock frequency setting processing goes to Step ST19G. In Step ST19E, in a case where the clock frequency is the first frequency, the second frequency, or the fourth frequency, affirmative determination is made, and the clock frequency setting processing goes to Step ST19F.

In Step ST19F, the CPU 94 sets the clock frequency to the third frequency, and thereafter, the clock frequency setting processing goes to Step ST19G.

In Step ST19G, the CPU 94 determines whether or not the polling processing indicated by the polling signal inputted in Step ST15B is completed. Determination on whether or not the polling processing is completed is performed, for example, by determination on whether or not all kinds of processing according to the first to third instruction signals included in the polling signal inputted in Step ST15B are completed. In Step ST19G, in a case where the polling processing is not completed, negative determination is made, and the clock frequency setting processing goes to Step ST19A. In Step ST19G, in a case where the polling processing is completed, affirmative determination is made, and the clock frequency setting processing goes to Step ST20.

In this way, in the clock frequency setting processing shown in FIG. 17, in a case where the intensity of the magnetic field MF is less than the threshold value, and the present time is in the period except for the response processing period in the polling processing, the clock frequency is set to the fourth frequency. In a case where the present time is within the response processing period, the clock frequency is set to the third frequency. A level relationship of the third frequency and the fourth frequency is "third frequency>fourth frequency". Accordingly, with this configuration, it is possible to reduce power consumption, as compared to a case where the clock frequency is constantly equal to or higher than the third frequency in a period during which the polling processing is executed.

Here, although an aspect where the clock frequency is changed in the period during which the polling processing is executed has been described, even though the processing is divided and executed in at least one of the read-out processing or the write-in processing, the clock frequency may be changed as in the polling processing.

In the above description, although the second frequency is set to the ½ frequency of the first frequency, the third frequency is set to the ¼ frequency of the first frequency, and the fourth frequency is set to the ⅛ frequency of the first frequency, the technique of the present disclosure is not limited thereto. That is, the second frequency should be a frequency lower than the first frequency, the third frequency should be a frequency lower than the second frequency, and the fourth frequency should be a frequency lower than the third frequency. At least one of a level at which the second frequency is made lower than the first frequency, a level at which the third frequency is made lower than the second frequency, or a level at which the fourth frequency is made lower than the third frequency may be changed according to a voltage remaining in the capacitor 54 and the internal capacitor 80, that is, power remaining the cartridge memory 19. For example, the computer 84 increases the level, at which the clock frequency is made lower, as power remaining in the cartridge memory 19 is lower.

In the above description, although an aspect where the clock frequency is changed in a stepwise manner has been exemplified, the technique of the present disclosure is not limited thereto, and the clock frequency may be changed in a stepless manner.

Figure 18:
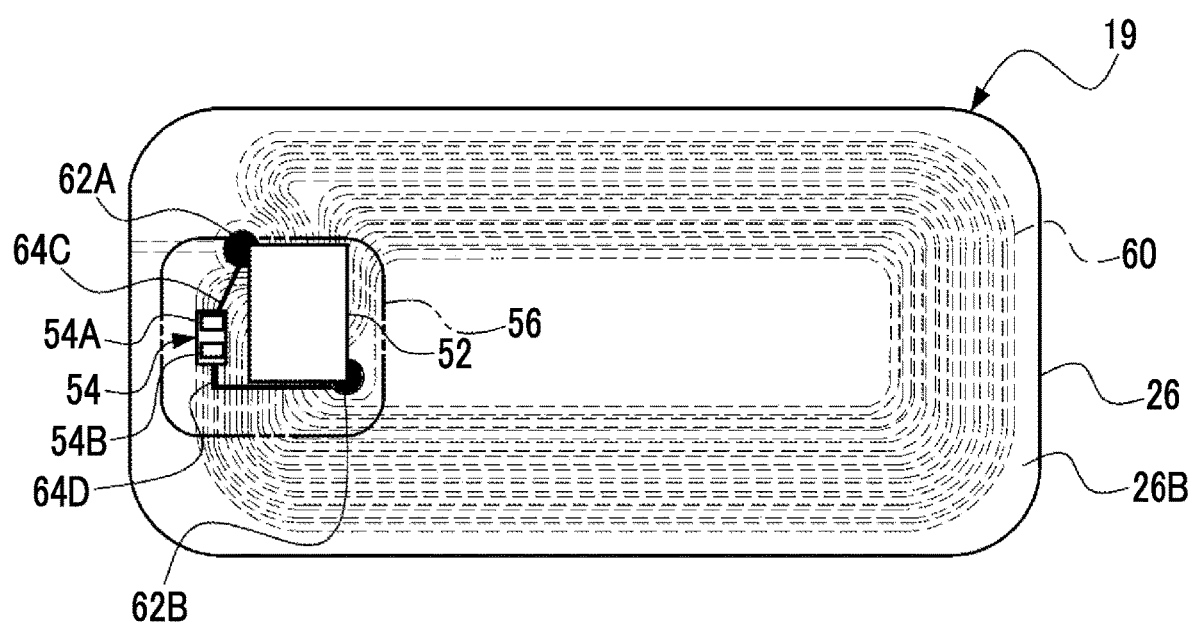
FIG. 18 is a schematic plan view of the cartridge memory in the magnetic tape cartridge according to the embodiment, and is a schematic plan view showing a modification example of a connection form of a coil and an IC chip.

In the above-described embodiment, although an aspect where the IC chip 52 and the coil 60 are connected using the wired connection method has been described, the technique of the present disclosure is not limited thereto. For example, as shown in FIG. 18, the IC chip 52 and the coil 60 may be connected using a flip-chip connection method. In this case, for example, one terminal of the positive electrode terminal and the negative electrode terminal of the IC chip 52 is connected directly to the first conduction portion 62A, and the other terminal is connected directly to the second conduction portion 62B.

Figure 19:
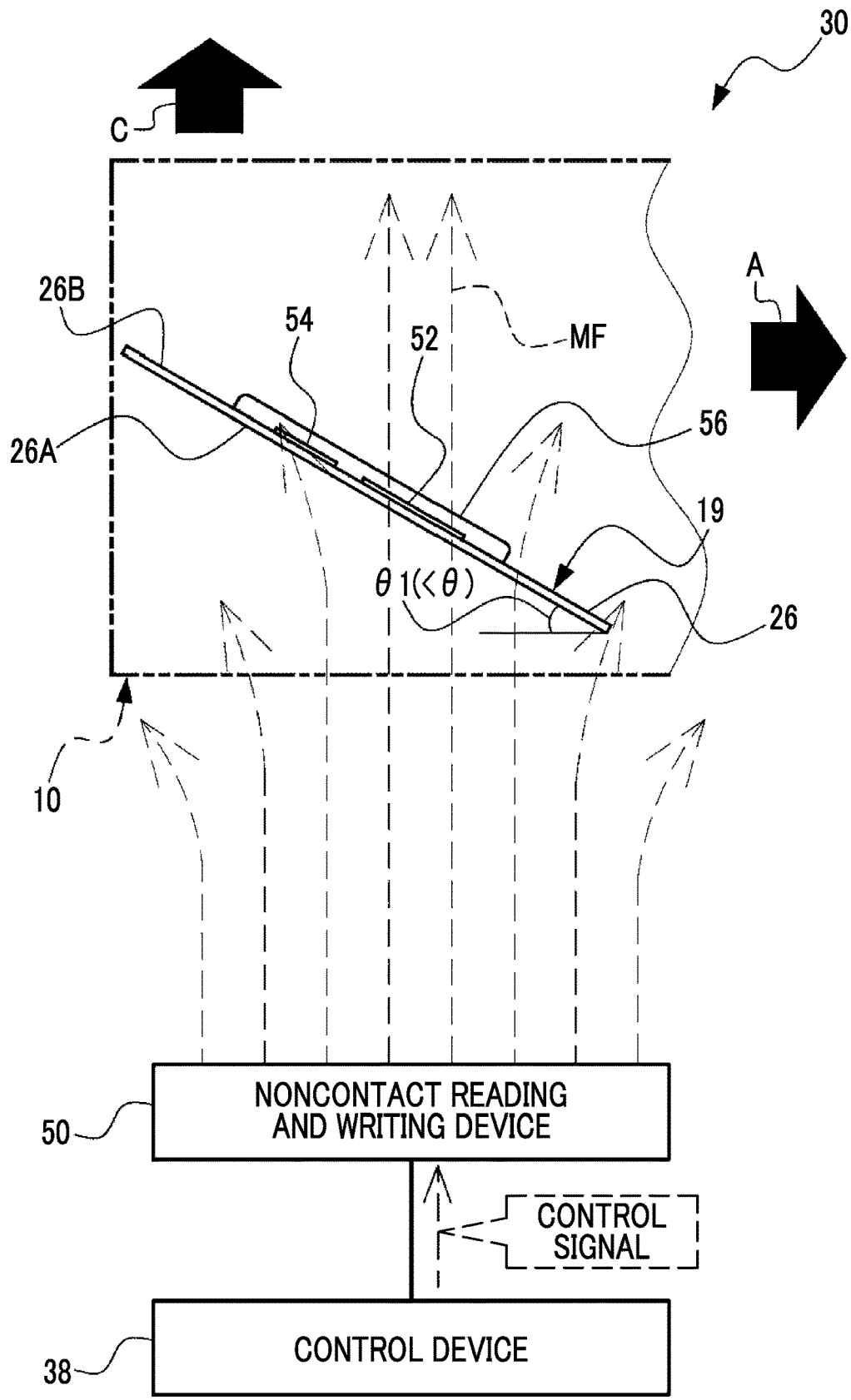
FIG. 19 is a conceptual diagram showing a modification example of an inclination angle of the cartridge memory in the magnetic tape cartridge according to the embodiment.

In the above-described embodiment, although 45 degrees have been exemplified as the inclination angle θ, the technique of the present disclosure is not limited thereto. As an example, as shown in FIG. 19, an inclination angle θ1 smaller than the inclination angle θ may be employed as the inclination angle with respect to the reference surface 16A1 of the cartridge memory 19. An example of the inclination angle θ1 is 30 degrees. Since the inclination angle θ1 is an angle smaller than the inclination angle θ, it is possible to make many lines of magnetic force pass through the coil 60 (see FIG. 7) compared to the case of the inclination angle θ. As a result, the coil 60 can obtain a large induced current in a state in which the magnetic tape cartridge 10 is loaded into the magnetic tape drive 30 compared to the case of the inclination angle θ.

Figure 20:
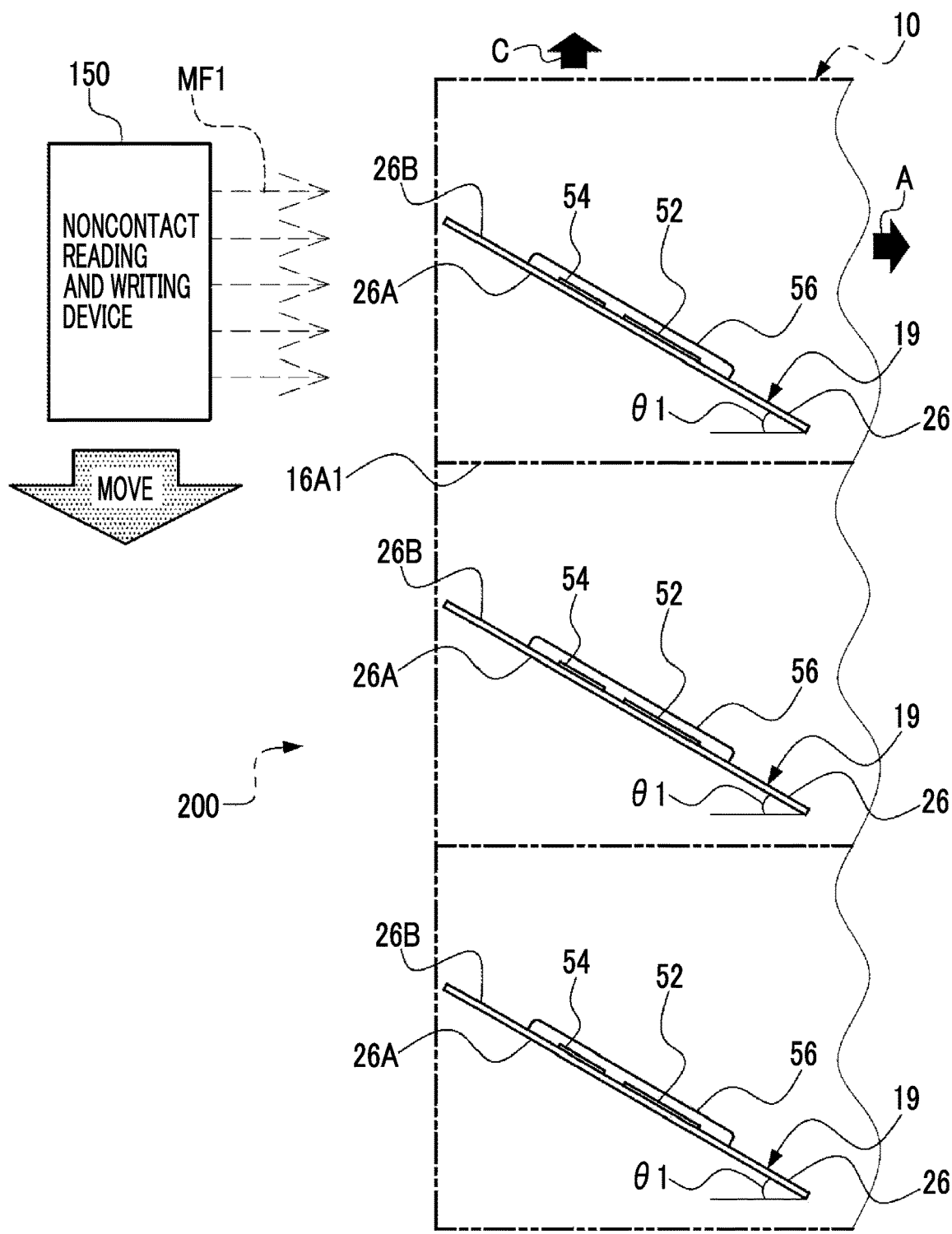
FIG. 20 is a conceptual diagram showing an example of an aspect in which a magnetic field is applied to a package of a plurality of magnetic tape cartridges according to the embodiment.

As an example, as shown in FIG. 20, in at least one of a production process of the magnetic tape cartridge 10, a management process of the magnetic tape cartridge 10, or a distribution process (for example, a distribution process in a market) in which the magnetic tape cartridge 10 is distributed, reading and writing of the management information 100 and the like are performed by a noncontact reading and writing device 150 from and to the cartridge memory 19 of each magnetic tape cartridge 10 in a package 200 in which a plurality of magnetic tape cartridges 10 stacked in an up-down direction are shrink-wrapped by a plastic film. Reading and writing of the management information 100 and the like from and to the cartridge memory 19 by the noncontact reading and writing device 150 are performed on a rear side of the magnetic tape cartridge 10 while moving the noncontact reading and writing device 150 along a direction in which a plurality of magnetic tape cartridges 10 are stacked. In this case, for example, the noncontact reading and writing device 150 sequentially emits the magnetic field MF1 to the respective magnetic tape cartridges 10 while repeating the on and off of the magnetic field MF1.

Incidentally, under an environment (under a first environment) that the magnetic tape cartridge 10 is loaded into the magnetic tape drive 30, the magnetic field MF (first magnetic field) is applied from a side confronting the reference surface 16A1 toward the back surface 26A (coil forming surface) of the substrate 26, on which the coil 60 is formed, from the lower direction or the upper direction of the magnetic tape cartridge 10 by the noncontact reading and writing device 50 (see FIG. 19). Thus, many lines of magnetic force pass through the coil 60 and a large induced current is obtained compared to a case where the inclination angle of the cartridge memory 19 is the inclination angle θ.

In contrast, under an environment (under a second environment) of at least one of the production process, the management process, or the distribution process, as an example, as shown in FIG. 20, a plurality of magnetic tape cartridges 10 are handled as the package 200. In this case, a magnetic field MF1 (second magnetic field) is applied from a side crossing a normal direction of the reference surface 16A1 and confronting the back surface 26A toward the back surface 26A. With this, it is possible to prevent reading and writing of the management information 100 from and to the unintended magnetic tape cartridge 10 in the package 200 (the occurrence of crosstalk), as compared to a case where the inclination angle of the cartridge memory 19 is the inclination angle θ.

In the example shown in FIG. 20, although an aspect where the noncontact reading and writing device 150 is moved along the up-down direction with respect to the package 200 in a case where the noncontact reading and writing device 150 performs communication with each cartridge memory 19 in the package 200 through the magnetic field MF1 has been exemplified, this aspect is merely an example, and the position of the noncontact reading and writing device 150 may be fixed and the package 200 may be moved along the up-down direction. The noncontact reading and writing device 150 and the package 200 may be moved in opposite directions in the up-down direction. In this way, in a case where the noncontact reading and writing device 150 performs communication with each cartridge memory 19 in the package 200 through the magnetic field MF1, the noncontact reading and writing device 150 may be relatively moved along the up-down direction with respect to the package 200.

In a case of performing reading and writing of the management information 100 and the like from and to the cartridge memory 19, the noncontact reading and writing device 150 emits the magnetic field MF1 from a rear side of the magnetic tape cartridge 10 toward the cartridge memory 19. The power generator 70 of the cartridge memory 19 generates power with application of the magnetic field MF1 to the coil 60 of the cartridge memory 19. Then, the noncontact reading and writing device 150 transmits the command signal to the cartridge memory 19 through the magnetic field MF1. The cartridge memory 19 executes the processing according to the command signal using power generated by the power generator 70 and transmits the processing result as the response signal to the noncontact reading and writing device 150. That is, various kinds of information are transferred between the noncontact reading and writing device 150 and the cartridge memory 19 through the magnetic field MF1.

To the cartridge memory 19 (hereinafter, referred to as a "reading and writing target cartridge memory" without attaching reference numeral) of one magnetic tape cartridge 10 (hereinafter, referred to as a "single cartridge" without attaching reference numeral) included in the package 200, the magnetic field MF1 is applied by the noncontact reading and writing device 150 from the rear side of the single cartridge toward the reading and writing target cartridge memory. However, in the case of the inclination angle θ, there is a concern that the magnetic field MF1 is applied to the cartridge memory 19 of the magnetic tape cartridge 10 (hereinafter, referred to as an "adjacent cartridge") adjacent to a single cartridge in the package 200 according to the directivity of the magnetic field MF1, and reading and writing of the management information 100 and the like are performed from and to the cartridge memory 19 of the adjacent cartridge. In other words, reading and writing of the management information 100 and the like from and to the cartridge memory 19 of the adjacent cartridge means the occurrence of crosstalk.

Here, in a case where the inclination angle θ1 is set, it is possible to make the number of lines of magnetic force passing through the coil 60 of the cartridge memory 19 smaller than the inclination angle θ, and the magnetic field MF1 is hardly applied to the cartridge memory 19 of the adjacent cartridge compared to the inclination angle θ. As a result, in a case where the inclination angle θ1 is set, it is possible to prevent erroneous reading and writing of the management information 100 and the like from and to the magnetic tape cartridge 10, that is, the occurrence of crosstalk compared to the inclination angle θ. As a result, for example, in the production process of the magnetic tape cartridge 10, it is possible to improve the productivity of the magnetic tape cartridge 10 without increasing equipment cost. In the management process of the magnetic tape cartridge 10, it is possible to improve the efficiency of the management of the magnetic tape cartridge 10 without increasing equipment cost.

Figure 21:
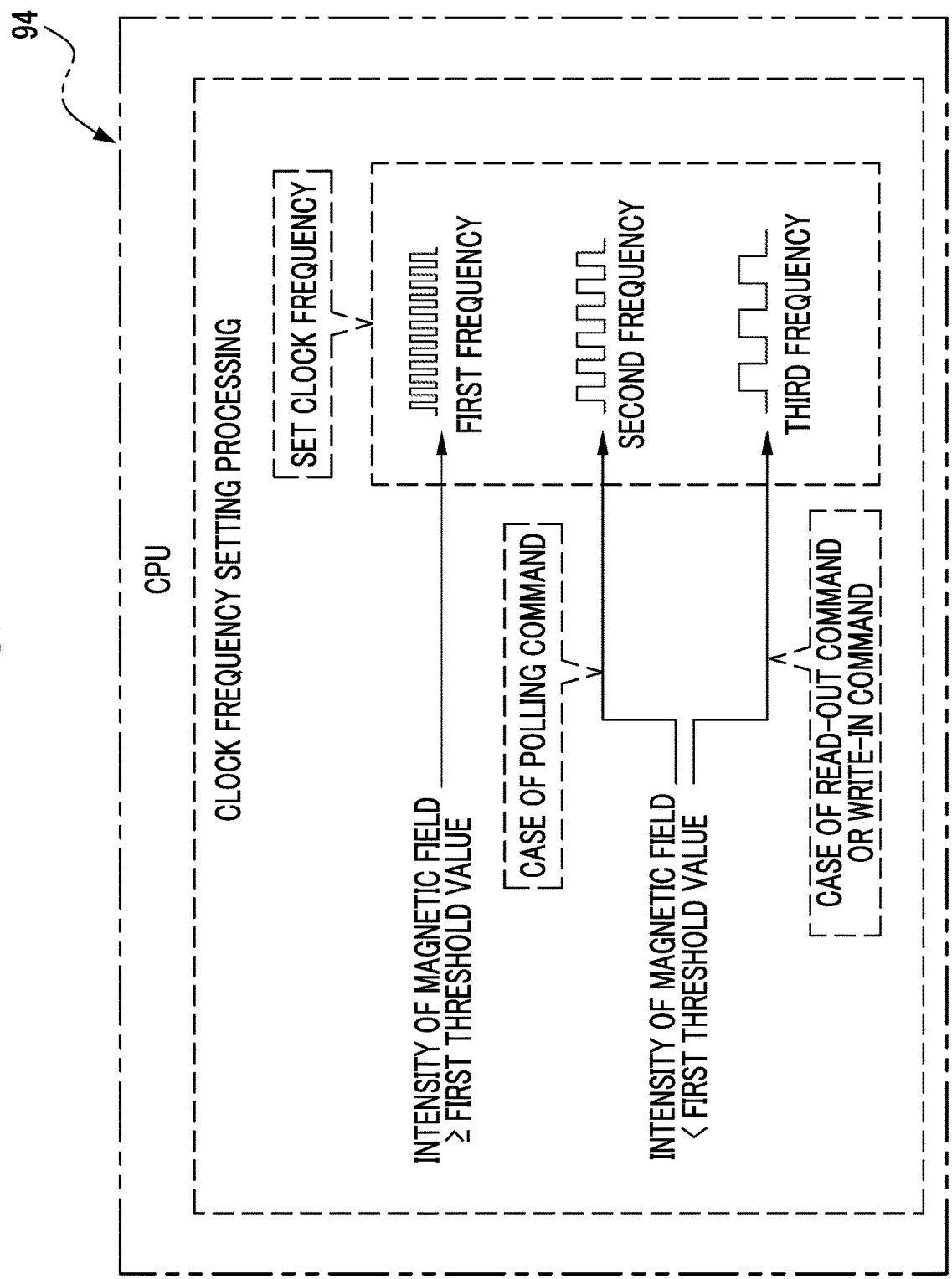
FIG. 21 is a conceptual diagram showing a fourth modification example of the clock frequency setting processing according to the embodiment.

In the example shown in FIG. 14, although an aspect where the second frequency is set as the clock frequency in a case where the command indicated by the command signal is the read-out command or the write-in command, and the third frequency is set as the clock frequency in a case where the command indicated by the command signal is the polling command has been exemplified, the technique of the present disclosure is not limited thereto. For example, as shown in FIG. 21, in a case where the intensity of the magnetic field MF is less than a first threshold value, and in a case where the command indicated by the command signal is the polling command, the second frequency may be set as the clock frequency. In a case where the intensity of the magnetic field MF is less than the first threshold value, and in a case where the command indicated by the command signal is the read-out command or the write-in command, the third frequency may be set as the clock frequency.

Figure 22A:
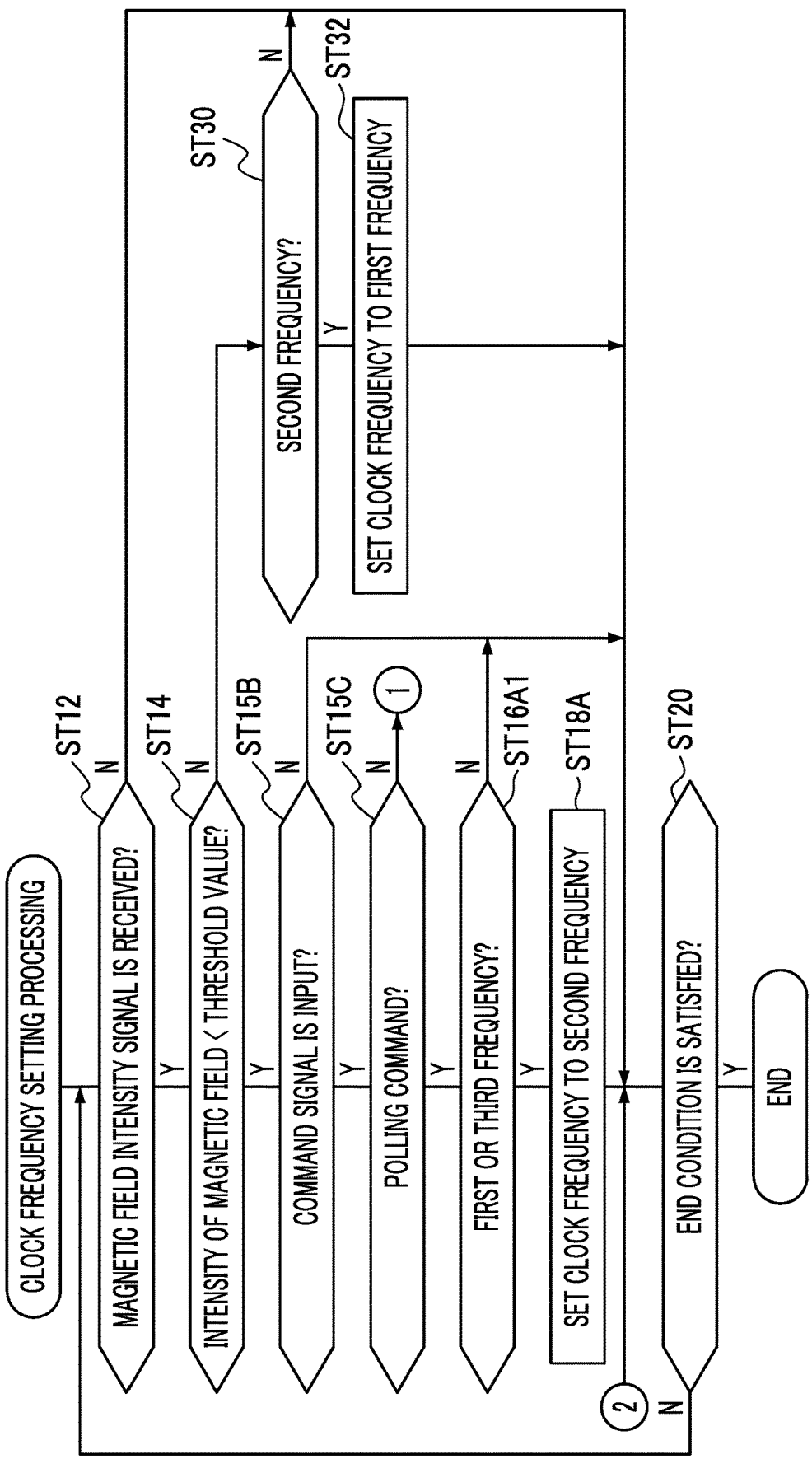
FIG. 22A is a flowchart showing a flow of processing of the fourth modification example of the clock frequency setting processing according to the embodiment.
Figure 22B:
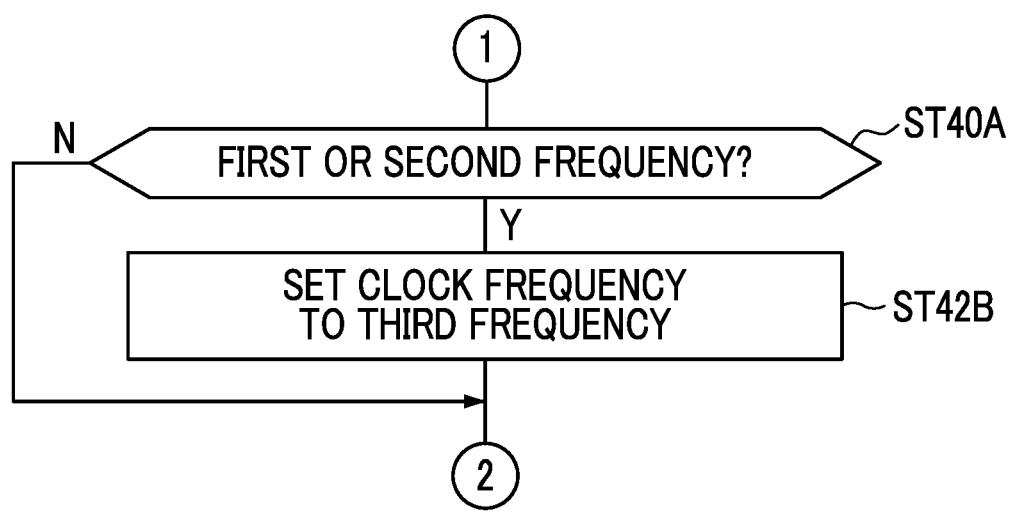
FIG. 22B is a continuation of the flowchart shown in FIG. 22A.

In this case, clock frequency setting processing shown in FIGS. 22A and 22B is executed instead of the clock frequency setting processing shown in FIG. 15A. A flowchart shown in FIG. 22A is different from the flowchart shown in FIG. 15A in that Step ST16A1 is provided instead of Step ST16A, and Step ST18A is provided instead of Step ST18. A flowchart shown in FIG. 22B is different from the flowchart shown in FIG. 15B in that Step ST40A is provided instead of Step ST40, and Step ST42A is provided instead of Step ST42.

In Step ST16A1 shown in FIG. 22A, the CPU 94 determines whether or not the clock frequency is the first frequency or the third frequency. In Step ST16A1, in a case where the clock frequency is the second frequency, negative determination is made, and the clock frequency setting processing goes to Step ST20. In Step ST16A1, in a case where the clock frequency is the first frequency or the third frequency, affirmative determination is made, and the clock frequency setting processing goes to Step ST18A.

In Step ST18A, the CPU 94 sets the clock frequency to the second frequency, and thereafter, the clock frequency setting processing goes to Step ST20.

In Step ST40A shown in FIG. 22B, the CPU 94 determines whether or not the clock frequency is the first frequency or the second frequency. In Step ST40A, in a case where the clock frequency is the third frequency, negative determination is made, and the clock frequency setting processing goes to Step ST20. In Step ST40A, in a case where the clock frequency is the first frequency or the second frequency, affirmative determination is made, and the clock frequency setting processing goes to Step ST42B.

In Step ST42B, the CPU 94 sets the clock frequency to the third frequency, and thereafter, the clock frequency setting processing goes to Step ST20.

Therefore, in a case where the command indicated by the command signal is the read-out command or the write-in command, the read-out processing or the write-in processing is executed by the CPU 94 in accordance with the third frequency that is the lowest clock frequency. Thus, it is possible to prevent power deficiency during the read-out processing or the write-in processing, as compared to a case where the read-out processing or the write-in processing is executed by the CPU 94 in accordance with the first frequency.

Figure 23:
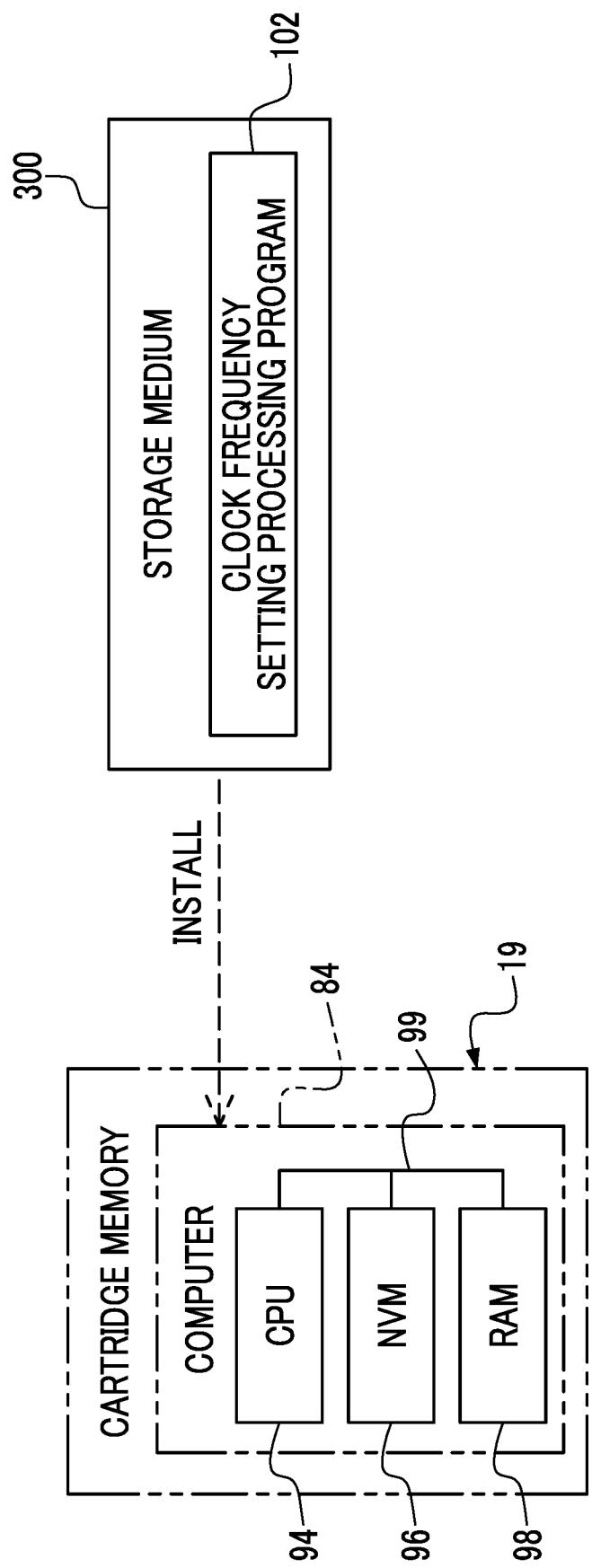
FIG. 23 is a block diagram showing an example of an aspect in which a clock frequency setting processing program is installed on the computer from a storage medium storing the clock frequency setting processing program according to the embodiment.

In the example shown in FIG. 10, although an aspect where the clock frequency setting processing program 102 is stored in the NVM 96 has been exemplified, the technique of the present disclosure is not limited thereto. For example, as shown in FIG. 23, the clock frequency setting processing program 102 may be stored in a storage medium 300. The storage medium 300 is a non-transitory storage medium. An example of the storage medium 300 is any portable storage medium, such as an SSD or a USB memory.

The clock frequency setting processing program 102 stored in the storage medium 300 is installed on the computer 84. The CPU 94 executes the clock frequency setting processing in accordance with the clock frequency setting processing program 102. In an example shown in FIG. 23, the CPU 94 is a single CPU, but may be a plurality of CPUs.

Alternatively, the clock frequency setting processing program 102 may be stored in a storage unit of another computer, a server device, or the like connected to the computer 84 through a communication network (not shown), and the clock frequency setting processing program 102 may be downloaded according to a request from the cartridge memory 19 and installed on the computer 84.

In the example shown in FIG. 23, although the computer 84 has been illustrated, the technique of the present disclosure is not limited thereto, and a device including at least one of an ASIC, an FPGA, or a PLD may be applied instead of the computer 84. Alternatively, a combination of a hardware configuration and a software configuration may be used instead of the computer 84.

As a hardware resource that executes the clock frequency setting processing, various processors described below can be used. Examples of the processors include a CPU that is a general-use processor executing software, that is, a program to function as a hardware resource executing the clock frequency setting processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the clock frequency setting processing.

The hardware resource executing the clock frequency setting processing may be configured of one of various processors or may be configured of a combination of two or more processors (for example, a combination of a plurality of FPGAs or a combination of a CPU and an FPGA) of the same type or different types. The hardware resource executing the clock frequency setting processing may be one processor.

As an example where the hardware resource is configured of one processor, first, there is a form in which one processor is configured of a combination of one or more CPUs and software, and the processor functions as the hardware resource executing the clock frequency setting processing. Second, as represented by SoC or the like, there is a form in which a processor that realizes the function of the entire system including a plurality of hardware resources executing the clock frequency setting processing with one IC chip is used. In this way, the clock frequency setting processing is realized using one or more of various processors as the hardware resource.

In addition, as the hardware structures of various processors, more specifically, an electric circuit into which circuit elements, such as semiconductor elements, are combined can be used. The above-described clock frequency setting processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

In regard to the above embodiment, the following appendixes are further disclosed.

Appendix 1

A noncontact management method that performs communication with a noncontact communication medium through an external magnetic field applied from an external device to manage a magnetic tape cartridge, in which the noncontact communication medium is housed, the noncontact communication medium including a substrate, on which a coil is formed, a power generator that generates power with application of the external magnetic field to the coil, and a processor that executes processing on a command included in the external magnetic field using the power generated by the power generator, and the external magnetic field being applied from the external device to the noncontact communication medium in the magnetic tape cartridge, on which a reference plane is formed, the noncontact management method comprising:

disposing the substrate to be inclined at an angle less than 45 degrees with respect to the reference plane, applying a first magnetic field as the external magnetic field from a side confronting the reference plane toward a coil forming surface of the substrate, on which the coil is formed, under a first environment that the magnetic tape cartridge is loaded into the magnetic tape drive, and applying a second magnetic field as the external magnetic field from a side crossing a normal direction of the reference plane and confronting the coil forming surface toward the coil forming surface under a second environment that the magnetic tape cartridge is present outside the magnetic tape drive.

Appendix 2

The noncontact management method according to Appendix 1, in which the second environment is at least one of a production process of the magnetic tape cartridge, a management process of the magnetic tape cartridge, or a distribution process in which the magnetic tape cartridge is distributed.

Appendix 3

The noncontact management method according to Appendix 1 or Appendix 2, in which each of the production process, the management process, and the distribution process includes a process of applying the second magnetic field to the noncontact communication medium in a package in which a plurality of the magnetic tape cartridges are stacked in the normal direction.

Appendix 4

The noncontact management method according to Appendix 3, in which the external device applies the external magnetic field to the coil forming surface of the noncontact communication medium of each of the plurality of magnetic tape cartridges while moving along the normal direction.

What is claimed is:

1. A noncontact communication medium comprising:
   a power generator that has a coil and generates power with application of an external magnetic field from an outside to the coil;
   a clock signal generator that generates a clock signal using the power;
   a processor that operates using the power and executes processing on a command included in the external magnetic field, wherein the command is a polling command, a read-out command, or a write-in command; and
   a first memory that stores information,
   wherein the clock signal generator makes a frequency of the clock signal lower as intensity of the external magnetic field is smaller, in a period except for a processing period in which the processor executes the processing,
   wherein the processor is configured to:
      in a case in which the command is a polling command, execute polling processing in accordance with the polling command,
      in a case in which the command is a read-out command, execute read-out processing related to the information stored by the first memory, in accordance with the read-out command, and
      in a case in which the command is a write-in command, execute write-in processing related to the information stored by the first memory, in accordance with the write-in command, and
   wherein the period except for the processing period in which the processor executes the processing is at least one of a period between the polling processing and the read-out processing, a period between the polling processing and the write-in processing, or a period between the read-out processing and the write-in processing.

2. The noncontact communication medium according to claim 1,
   wherein the clock signal generator changes the frequency according to a kind of the command.

3. The noncontact communication medium according to claim 1,
wherein the coil transmits a processing result of the processing executed by the processor through the external magnetic field.

4. A magnetic tape cartridge comprising:
the noncontact communication medium according to claim 1; and
a magnetic tape,
wherein the noncontact communication medium has a second memory, and
the second memory stores information relating to the magnetic tape.

5. An operation method of a noncontact communication medium including a power generator that has a coil and generates power with application of an external magnetic field from an outside to the coil, a first memory that stores information, a clock signal generator that generates a clock signal using the power, and a processor that operates using the power and executes processing on a command included in the external magnetic field, wherein the command is a polling command, a read-out command, or a write-in command, the operation method comprising:
  making a frequency of the clock signal lower as intensity of the external magnetic field is smaller, in a period except for a processing period in which the processor executes the processing; and
  via the processor:
    in a case in which the command is a polling command, executing polling processing in accordance with the polling command,
    in a case in which the command is a read-out command, executing read-out processing related to the information stored by the first memory, in accordance with the read-out command, and
    in a case in which the command is a write-in command, executing write-in processing related to the information stored by the first memory, in accordance with the write-in command,
  wherein the period except for the processing period in which the processor executes the processing is at least one of a period between the polling processing and the read-out processing, a period between the polling processing and the write-in processing, or a period between the read-out processing and the write-in processing.

6. A non-transitory computer-readable storage medium storing a program that is executable by a computer, which is applied to a noncontact communication medium including a power generator that has a coil and generates power with application of an external magnetic field from an outside to the coil, a first memory that stores information, a clock signal generator that generates a clock signal using the power, and a processor that operates using the power and executes processing on a command included in the external magnetic field, wherein the command is a polling command, a read-out command, or a write-in command, to perform processing comprising:
  making a frequency of the clock signal lower as intensity of the external magnetic field is smaller, in a period except for a processing period in which the processor executes the processing;
  in a case in which the command is a polling command, executing polling processing in accordance with the polling command;
  in a case in which the command is a read-out command, executing read-out processing related to the information stored by the first memory, in accordance with the read-out command; and
  in a case in which the command is a write-in command, executing write-in processing related to the information stored by the first memory, in accordance with the write-in command,
  wherein the period except for the processing period in which the processor executes the processing is at least one of a period between the polling processing and the read-out processing, a period between the polling processing and the write-in processing, or a period between the read-out processing and the write-in processing.

* * * * *